(12) United States Patent
Kitamura et al.

(10) Patent No.: US 9,690,545 B2
(45) Date of Patent: Jun. 27, 2017

(54) FLOATING-POINT CALCULATION APPARATUS, PROGRAM, AND CALCULATION APPARATUS

(71) Applicant: HONDA MOTOR CO., LTD., Tokyo (JP)

(72) Inventors: Shiro Kitamura, Wako (JP); Tomoyuki Okumura, Tokyo (JP); Hiroshi Nanjo, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 273 days.

(21) Appl. No.: 14/725,523

(22) Filed: May 29, 2015

(65) Prior Publication Data

US 2015/0355884 A1 Dec. 10, 2015

(30) Foreign Application Priority Data

Jun. 10, 2014 (JP) .................. 2014-119865

(51) Int. Cl.
   *G06F 7/00* (2006.01)
   *G06F 7/485* (2006.01)
   *G06F 7/509* (2006.01)

(52) U.S. Cl.
   CPC ............ *G06F 7/485* (2013.01); *G06F 7/5095* (2013.01)

(58) Field of Classification Search
   None
   See application file for complete search history.

(56) References Cited

U.S. PATENT DOCUMENTS

| 4,075,704 A * | 2/1978 | O'Leary | G06F 7/483 708/503 |
| 5,392,228 A * | 2/1995 | Burgess | G06F 5/012 708/205 |
| 5,588,152 A * | 12/1996 | Dapp | G06F 9/3838 712/16 |
| 5,729,485 A * | 3/1998 | Wolrich | G06F 7/5312 708/620 |
| 6,408,379 B1 * | 6/2002 | Juffa | G06F 7/483 708/498 |
| 2007/0192547 A1 * | 8/2007 | Feghali | G06F 9/3001 711/154 |

FOREIGN PATENT DOCUMENTS

| JP | 05-181645 | 7/1993 |
| JP | 06-059858 | 3/1994 |

* cited by examiner

*Primary Examiner* — Michael D Yaary
(74) *Attorney, Agent, or Firm* — Rankin, Hill & Clark LLP

(57) ABSTRACT

A floating-point calculation apparatus comprising: a selection part; an addition and subtraction calculation part; an output determination part; and a buffer management part configured to add, when it is determined that a buffer used to store an input value is not prepared, a buffer that corresponds to the input value, wherein when a number of significant digits of the result of performing an addition and subtraction calculation exceeds a number of significant digits of the buffer selected by the selection part, the addition and subtraction calculation part shifts right or shifts left part of the result of performing the addition and subtraction calculation and divides the result of performing the addition and subtraction calculation into values each being storable in one of a plurality of buffers.

10 Claims, 14 Drawing Sheets

| NUMERICAL DATA | | ABSENCE OF ADDITION OF BUFFER REGION | | | |
|---|---|---|---|---|---|
| No. | data | | BUFFER REGION | BUFFER REGION | |
| | | SETTING EXPONENT | 1073 | 1074 | |
| | | | 0 | -16 | |
| D41 | 1.0000000000000001E-16 | 2 | 0.0000000000000000 | 0.0000000000000000 | |
| D42 | 2.0000000000000002E-32 | 2 | 0.0000000000000000 | 1.0000000000000010 | |
| | | | 0.0000000000000000 | 1.0000000000000010 | |
| D43 | -1.0000000000000001E-16 | 2 | 0.0000000000000000 | 0.0000000000000000 | (SHORTAGE OF NUMBER OF SIGNIFICANT DIGITS) |
| | | | 0.0000000000000000E+00 | 0.0000000000000000E+00 | |
| | | | 0.0000000000000000E+00 | | |

⇩ ACCUMULATED ADDITION RESULT (RESULT DUE TO DIFFERENCE OF CALCULATION ACCURACY)

| | PRESENCE OF ADDITION OF BUFFER REGION | | |
|---|---|---|---|
| BUFFER REGION | BUFFER REGION | BUFFER REGION | |
| 1073 | 1074 | 1075 | |
| 0 | -16 | -32 | |
| 0.0000000000000000 | 0.0000000000000000 | | |
| 0.0000000000000000 | 1.0000000000000010 | | |
| 0.0000000000000000 | 1.0000000000000010 | 2.0000000000000020 | (NEWLY GENERATE ACCUMULATION ADDER) |
| 0.0000000000000000 | 0.0000000000000000 | 2.0000000000000020 | |
| 0.0000000000000000E+00 | 0.0000000000000000E-16 | 2.0000000000000020E-32 | |
| 2.0000000000000002E-32 | | | |

FLOATING-POINT CALCULATION APPARATUS, PROGRAM, AND CALCULATION APPARATUS

CROSS-REFERENCE TO RELATED APPLICATION

Priority is claimed on Japanese Patent Application No. 2014-119865, filed on Jun. 10, 2014, the contents of which are incorporated herein by reference.

BACKGROUND

Field of the Invention

The present invention relates to a floating-point calculation apparatus, a program, and a calculation apparatus.

Background

In an analysis process by computational fluid dynamics (hereinafter, referred to as CFD: Computational Fluid Dynamics), a simulation that reproduces a physical phenomenon or the like is performed. In the simulation, there is a case in which a computer is used to perform a floating-point calculation. However, it is known that, in floating-point calculations, part of the information relating to an extremely small value is lost, and thereby an error arises in the calculation result. In order to prevent such a loss of trailing digits, for example, a technique is known that makes cancellation of significant digits at the time of addition as little as possible by performing a calculation in the order of the magnitude of the absolute value and performs a highly accurate numerical integral (for example, refer to Japanese Patent Application, Publication No. H5-181645). Further, a technique is known that normalizes a calculation result in which a loss of trailing digits has occurred (for example, refer to Japanese Patent Application, Publication No. H6-59858).

SUMMARY

However, when a calculation process is performed based on input values obtained by a larger number of numerical values as the target of the calculation process being sequentially output, it is difficult to rearrange the input values in ascending order and calculate the rearranged input values. Therefore, it is difficult to provide a technique that prevents the loss of trailing digits described above, and there is a problem in that the accuracy of the calculation result by the floating-point calculation cannot be improved.

In view of the foregoing, an object of an aspect of the present invention is to provide a floating-point calculation apparatus, a program, and a calculation apparatus capable of obtaining a highly accurate calculation result by a floating-point calculation.

(1) A floating-point calculation apparatus according to an aspect of the present invention includes: a selection part configured to select, based on an exponent part of an input value, a buffer that corresponds to the input value from a plurality of buffers, one of the buffers storing each of a plurality of values having a different exponent; an addition and subtraction calculation part configured to write a result of performing an addition and subtraction calculation based on the input value and a value stored in the buffer selected by the selection part, on the buffer selected by the selection part; an output determination part configured to determine, based on the value stored in the buffer, an output value of an addition and subtraction calculation based on a plurality of input values; and a buffer management part configured to add a buffer that corresponds to the input value when it is determined, based on the exponent part of the input value, that a buffer used to store the input value is not prepared, wherein when a number of significant digits of the result of performing the addition and subtraction calculation exceeds a number of significant digits of the buffer selected by the selection part, the addition and subtraction calculation part shifts right or shifts left part of the result of performing the addition and subtraction calculation and divides the result of performing the addition and subtraction calculation into values each being storable in one of a plurality of buffers.

(2) In the aspect of the above (1), when a number of significant digits of the input value exceeds a number of significant digits of the buffer, the buffer management part may divide the input value into values each being storable in one of a plurality of buffers.

(3) In the aspect of the above (2), the buffer management part may change a buffer size of the added buffer depending on a memory residual quantity of the buffer.

(4) In the aspect of any one of the above (1) to (3), the floating-point calculation apparatus may include a plurality of calculation parts each including the selection part, the addition and subtraction calculation part, and the output determination part, and may further include an entire process unit configured to obtain one calculation result based on output values from the plurality of calculation parts.

(5) In the aspect of the above (4), the entire process unit may determine, based on an exponent of the buffer in each of the plurality of the calculation parts, an exponent of the output value acquired from the calculation part, and the calculation part may extract an output value of an exponent determined by the entire process unit and output the extracted output value to the entire process unit.

(6) According to another aspect of the present invention, there is provided a non-transitory computer-readable recording medium including a program for causing a computer to execute: (a) selecting, based on an exponent part of an input value, a buffer that corresponds to the input value from a plurality of buffers, one of the buffers storing each of a plurality of values having a different exponent; (b) writing a result of performing an addition and subtraction calculation based on the input value and a value stored in the buffer selected in (a), on the buffer selected in (a), and when a number of significant digits of the result of performing the addition and subtraction calculation exceeds a number of significant digits of the buffer selected in (a), shifting right or shifting left part of the result of performing the addition and subtraction calculation and dividing the result of performing the addition and subtraction calculation into values each being storable in one of a plurality of buffers; (c) determining, based on the value stored in the buffer, an output value of an addition and subtraction calculation based on a plurality of input values; and (d) determining whether or not a buffer used to store the input value is prepared based on the exponent part of the input value, and when it is determined that a buffer used to store the input value is not prepared, adding a buffer that corresponds to the input value.

(7) A calculation apparatus according to another aspect of the present invention includes: a parameter calculation part configured to calculate a parameter of a fluid that flows around an object per calculation unit; an air resistance value calculation part configured to calculate an air resistance value that acts on the object based on the parameter of the fluid calculated by the parameter calculation part; and a time direction addition and subtraction calculation part configured to perform an addition and subtraction calculation in a time direction of at least any one of a plurality of the parameters of the fluid calculated by the parameter calculation part and a plurality of the air resistance values calculated by the air resistance value calculation part, wherein the time direction addition and subtraction calculation part includes: a selection part configured to input the parameter of the fluid or the air resistance value as an input value and select, based on an exponent part of the input value, a buffer that corresponds to the input value from a plurality of buffers, one of the buffers storing each of a plurality of values having a different exponent; an addition and subtraction calculation part configured to write a result of performing an addition and subtraction calculation based on the input value and a value stored in the buffer selected by the selection part, on the buffer selected by the selection part; an output determination part configured to determine, based on the value stored in the buffer, an output value of an addition and subtraction calculation based on a plurality of input values; and a buffer management part configured to determine whether or not a buffer used to store the input value is prepared based on the exponent part of the input value, and when it is determined that a buffer used to store the input value is not prepared, add a buffer that corresponds to the input value, and wherein when a number of significant digits of the result of performing the addition and subtraction calculation exceeds a number of significant digits of the buffer selected by the selection part, the addition and subtraction calculation part shifts right or shifts left part of the result of performing the addition and subtraction calculation and divides the result of performing the addition and subtraction calculation into values each being storable in one of a plurality of buffers.

(8) In the aspect of the above (7), the calculation apparatus may further include a convergence determination part configured to determine whether or not a variation in the time direction of the air resistance value calculated by the air resistance value calculation part has converged, wherein the time direction addition and subtraction calculation part may perform an addition and subtraction calculation based on values obtained after the convergence determination part determines that the variation in the time direction of the air resistance value has converged.

According to the aspects of the above (1), (4), the calculation part stores an addition and subtraction result of input values in each of buffer regions, one of the buffer regions corresponding to a different setting exponent, and obtains a final calculation result. Thereby, it is possible to obtain, as a calculation result, even a small value that may be deleted as an error. Therefore, it is possible to obtain a highly accurate calculation result from a floating-point calculation.

Further, according to the aspect of the above (1), when a calculation result of each buffer region exceeds a number of significant digits of the buffer region, the calculation part can shift the calculation result right to match a buffer region having an upper setting exponent or shift the calculation result left to match a buffer region having a lower setting exponent. Therefore, the calculation part is able to store in the buffer region, as a calculation result, even a value that cannot match the number of significant digits of the buffer region, and it is possible to further enhance the accuracy of the calculation result.

Further, according to the aspect of the above (1), when a buffer region that corresponds to the exponent part "e" of the acquired input value is not prepared, the buffer management part is able to add a buffer region that corresponds to the exponent part "e" of the acquired input value. Therefore, the calculation part is able to store in the buffer region, as a calculation result, even a small value that may be deleted as an error, and it is possible to further enhance the accuracy of the calculation result.

BRIEF DESCRIPTION OF THE DRAWINGS

FIG. 13 is a reference diagram used to describe Example 3 by the calculation part.

FIG. 14 is a reference diagram used to describe Example 4 by the calculation part.

DESCRIPTION OF THE EMBODIMENTS

Hereinafter, a calculation apparatus according to an embodiment of the present invention will be described with reference to the drawings. In the present embodiment, a calculation apparatus 1 that performs an analysis process by the CFD is described.

Figure 1:
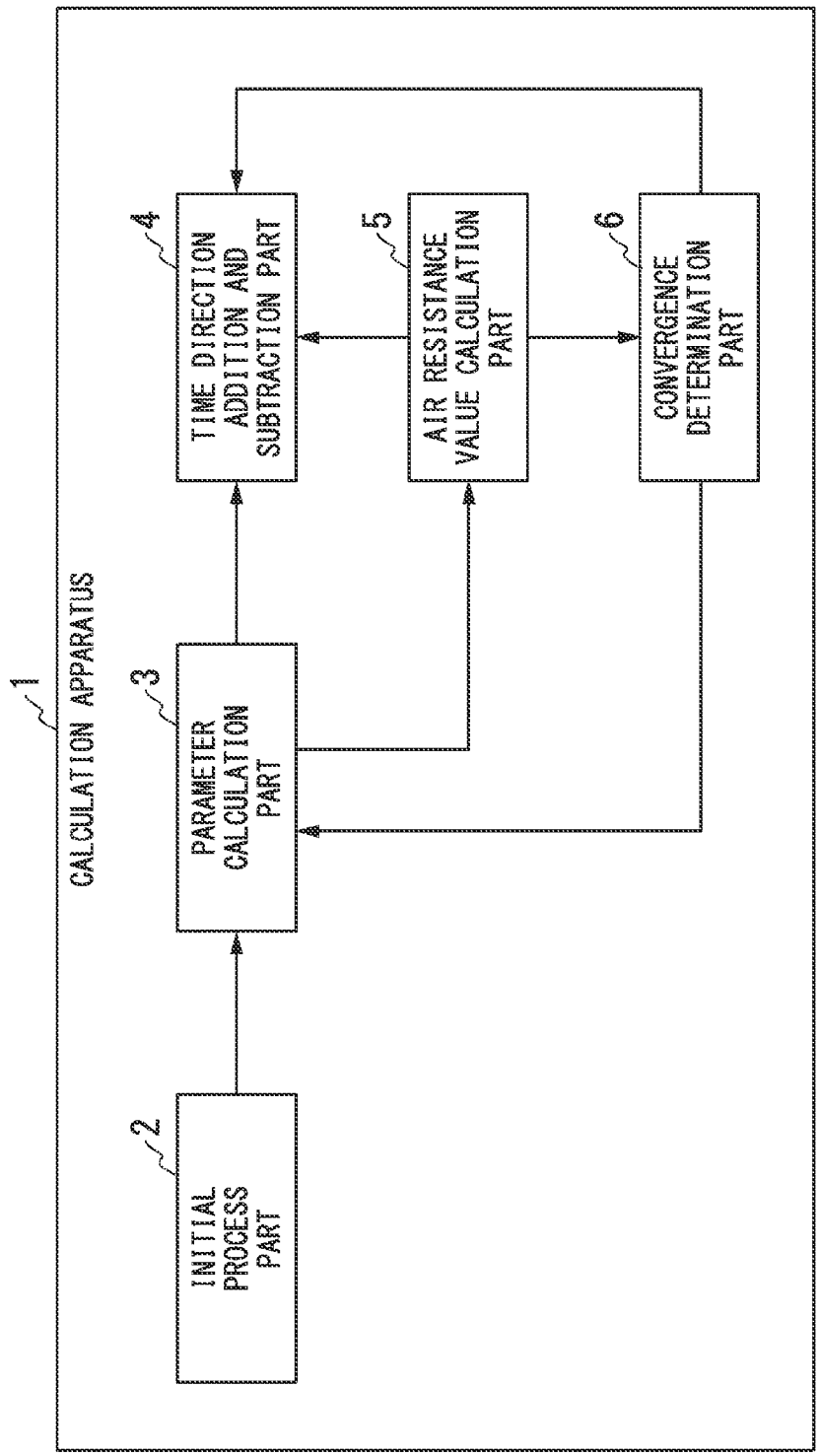
FIG. 1 is block diagram showing a configuration example of a calculation apparatus.
Figure 2:
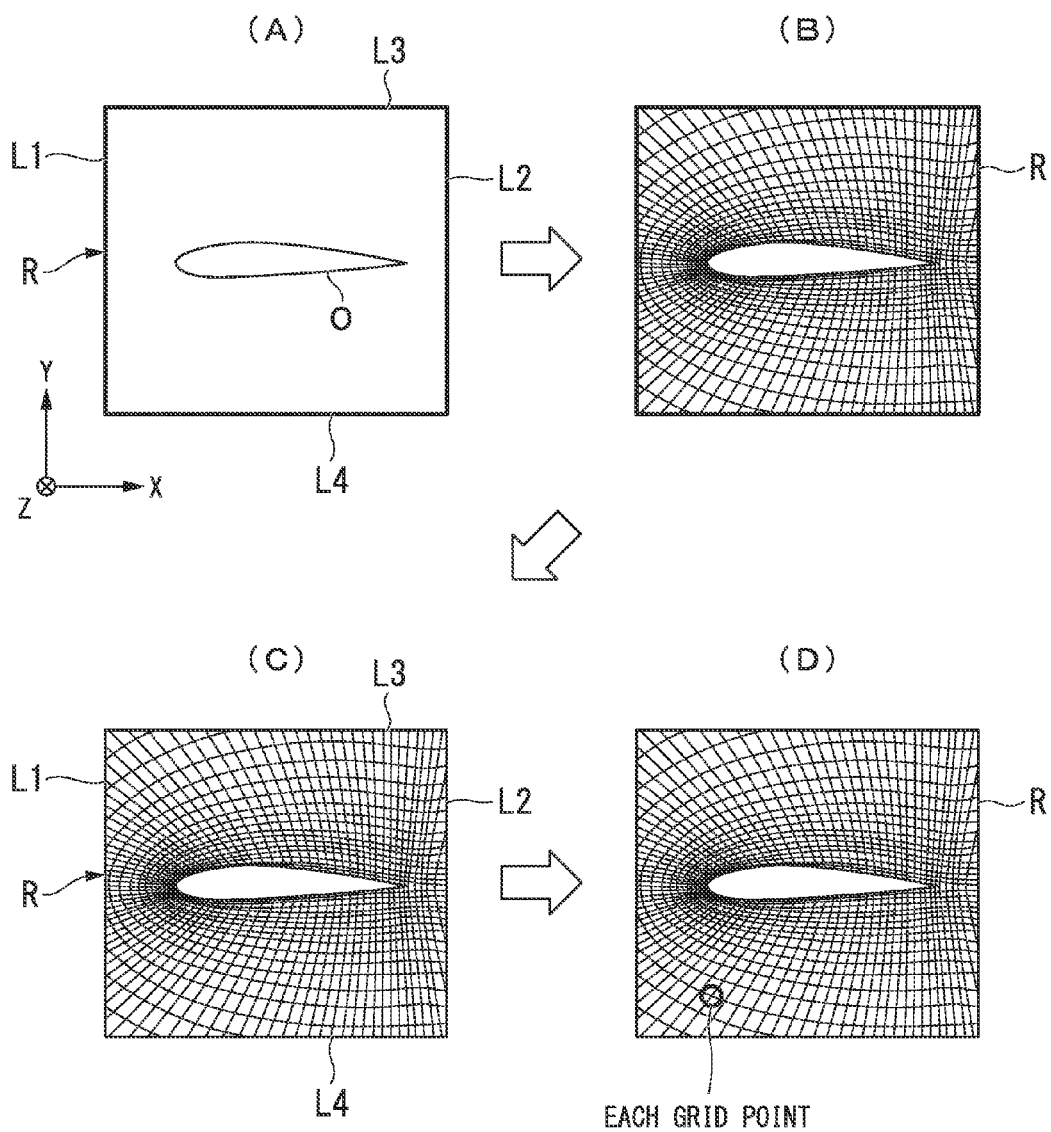
FIG. 2 is a reference diagram used to describe a calculation of a parameter of fluid that flows around an object.

With reference to FIGS. 1 and 2, the calculation apparatus 1 is described. FIG. 1 is block diagram showing a configuration example of the calculation apparatus 1. FIG. 2 is a reference diagram used to describe a calculation of a parameter of fluid that flows around an object.

As shown in FIG. 1, the calculation apparatus 1 includes an initial process part 2, a parameter calculation part 3, a time direction addition and subtraction part 4, an air resistance value calculation part 5, and a convergence determination part 6.

The initial process part 2 performs an initial process of the analysis process by the CFD.

First, the initial process part 2 sets an object O and a calculation region R shown in FIG. 2(A). In the example of FIG. 2(A), the object O is a wing, and the calculation region R is a space that extends in X-axis, Y-axis, and Z-axis directions. The calculation field R is a field that represents a flow around the object, the flow being intended to be calculated, and is a region surrounded by an inlet boundary L1, an outlet boundary L2, an upper surface boundary L3, and a lower boundary L4.

Next, the initial process part 2 sets a grid shown in FIG. 2(B) in the calculation region R.

The initial process part 2 sets a mesh grid at a location where a fluid phenomenon is solved as shown in FIG. 2(B) and sets a point (hereinafter, referred to as a grid point) where the meshes cross with each other. Note that, a normal vector on the surface of the object O is naturally determined by the shape of the object O being determined. The initial process part 2 sets the mesh of the grid by lines, for example, the intervals between the adjacent lines being increased logarithmically by a reference distance in the normal vector direction.

The initial process part 2 sets a boundary condition as shown in FIG. 2(C). In the embodiment, the initial process part 2 sets, as a condition in the inlet boundary L1, a condition in the outlet boundary L2, a condition in the upper surface boundary L3, and a condition in the lower boundary L4, condition values for reproducing a physics implication in each boundary.

The initial process part 2 sets an initial condition of each grid point as shown in FIG. 2(D). In the embodiment, the initial process part 2 sets a value of a solution vector on each grid point. The solution vector is a vector of density, momentum, and total energy.

The parameter calculation part 3 calculates a parameter (conserved quantity) of fluid per calculation unit (grid) based on a predetermined calculation formula. In the embodiment, the parameter calculation part 3 calculates the solution vector as the parameter of fluid. Further, the parameter calculation part 3 updates the solution vector, for example, by advancing time by Δt and performs time integration of the solution vector.

The time direction addition and subtraction calculation part 4 performs an addition and subtraction calculation, in a time direction, of the parameter (conserved quantity) of fluid per calculation unit (grid) calculated by the parameter calculation part 3. In the present embodiment, when the convergence determination part 6 determines that the variation in the time direction of an air resistance value (Cd (Constant Drag) value) has converged, the time direction addition and subtraction calculation part 4 performs an addition and subtraction calculation, in the time direction, of the solution vector calculated by the parameter calculation part 3 after the convergence determination part 6 determines that the variation has converged.

The time direction addition and subtraction calculation part 4 includes a plurality of calculation parts 100, one of the calculation parts 100 corresponding to each of the grids, and each of the calculation parts 100 performs an addition and subtraction calculation in the time direction of the parameter of fluid per calculation unit (grid). Further, the time direction addition and subtraction calculation part 4 includes an entire process unit 12 that further performs an addition and subtraction calculation of calculation results of the plurality of the calculation parts 100. The calculation part 100 and the entire process unit 12 are described later with reference to FIG. 4.

Further, the time direction addition and subtraction calculation part 4 performs an addition and subtraction calculation, in the time direction, of the air resistance value (Cd value) per calculation unit (grid) calculated by the parameter calculation part 3. In the present embodiment, when the convergence determination part 6 determines that the variation of the air resistance value (Cd value) has converged, the time direction addition and subtraction calculation part 4 performs an addition and subtraction calculation, in the time direction, of the air resistance value (Cd value) calculated after the convergence determination part 6 determines that the variation has converged.

The time direction addition and subtraction calculation part 4 includes calculation parts 100 for each grid, the calculation parts 100 being different from those used for the addition and subtraction calculation of the parameter of fluid, and each of the calculation parts 100 performs an addition and subtraction calculation in the time direction of the air resistance value (Cd value) per calculation unit (grid). Further, the time direction addition and subtraction calculation part 4 includes an entire process unit 12 that further performs an addition and subtraction calculation of calculation results of the air resistance values (Cd values) by the calculation parts 100.

The air resistance value calculation part 5 calculates an air resistance value (Cd value) that acts on the object O. The air resistance value calculation part 5 obtains the air resistance value (Cd value) from a pressure on the surface of the object O, the normal vector of the surface of the object O, and the direction of the resistance that is intended to be obtained. The pressure of the surface of the object O is obtained from the vector of density, momentum, and total energy of the solution vector.

The convergence determination part 6 determines a convergence degree of the air resistance value (Cd value) calculated by the air resistance value calculation part 5. When time is advanced by Δt, the updated air resistance value (Cd value) first varies and then converges. The convergence determination part 6 compares the air resistance value (Cd value) before time is advanced by Δt and the air resistance value (Cd value) after time is advanced by Δt. When the difference between the air resistance value (Cd value) after the time Δt passes and the air resistance value (Cd value) before the time Δt passes is a threshold value or less, or when a state where the difference between the air resistance values (Cd values) is the threshold value or less continues for a predetermined duration, the convergence determination part 6 determines that the air resistance value (Cd value) has converged.

Here, a calculation example used to obtain the solution vector by the parameter calculation part 3 is described.

The parameter calculation part 3 obtains the solution vector, for example, by treating the partial differentiation of the Navier-Stokes equation in a conservation form shown in Expression (1) as a difference.

[Expression 1]

$$\frac{\partial U}{\partial t} + \frac{\partial F_j}{\partial x_j} - \frac{1}{\text{Re}} \frac{\partial G_j}{\partial x_j} = 0 \tag{1}$$

Here, t is time, x is a coordinate, and Re is the Reynolds number. In the expressions described above and below, i, j, and k represent coordinate indexes, and the Einstein's sum rule applies to each of the indexes. A conservation variable vector U, an inviscid flux vector F(U), and a viscous flux vector G(U) are defined by Expression (2).

[Expression 2]

$$U = \begin{bmatrix} \rho \\ \rho u_i \\ \rho e \end{bmatrix}, F = \begin{bmatrix} \rho u_j \\ \rho u_i u_j + p\delta_{ij} \\ u_j(\rho e + p) \end{bmatrix}, G = \begin{bmatrix} 0 \\ \tau_{ij} \\ u_k \tau_{kj} + \kappa(\partial T / \partial x_j) \end{bmatrix} \tag{2}$$

Here, ρ is density, p is pressure, e is total energy, T is temperature, and K is the thermal conductivity of fluid. The velocity component of a flow in the coordinate direction is represented by $u_i$. The set of the equations is closed by the state equation for perfect gas.

[Expression 3]

$$p = (\gamma - 1)\rho\left(e - \frac{1}{2}u_j u_j\right) \quad (3)$$

Here, γ is a ratio of specific heat. A component $\tau_{ij}$ of a viscous stress tensor is given by Expression (4).

[Expression 4]

$$\tau_{ij} = \mu\left(\frac{\partial u_i}{\partial x_j} + \frac{\partial u_j}{\partial x_i}\right) - \frac{2}{3}\mu \frac{\partial u_k}{\partial x_k}\delta_{ij} \quad (4)$$

Here, $\delta_{ij}$ is the Kronecker delta. A viscosity coefficient defined by the Sutherland's relation is represented by μ.

Figure 3:
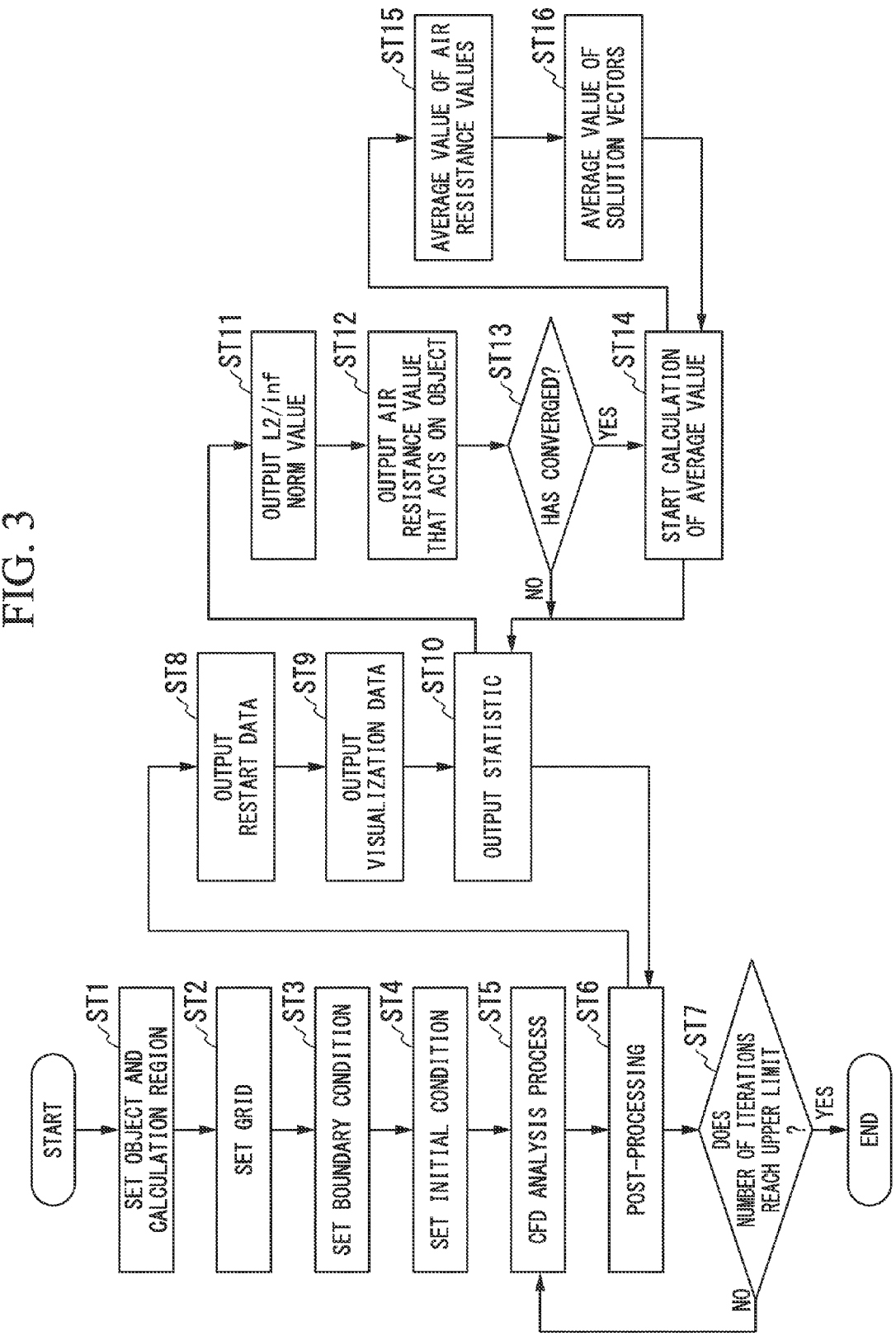
FIG. 3 is a flowchart used to describe a process example by the calculation apparatus.

Next, a process by the calculation apparatus 1 is described with reference to FIG. 3. FIG. 3 is a flowchart used to describe a process example by the calculation apparatus 1.

First, the initial process part 2 sets the object O and the calculation region R (step ST1) and sets a grid in the calculation region R (step ST2). The initial process part 2 sets a boundary condition (step ST3) and sets an initial condition of each grid point (step ST4).

Next, the parameter calculation part 3 performs a CFD analysis process (step ST5). For example, the parameter calculation part 3 calculates a solution vector of each grid based on a predetermined calculation formula and performs time integration of the solution vector.

The calculation apparatus 1 performs a post-processing (step ST6). The calculation apparatus 1 determines whether or not the number of iterations of calculating the solution vector in the time direction reaches an upper limit (step ST7). The calculation apparatus 1 repeatedly performs the CFD analysis process and the post-processing until the number of iterations reaches the upper limit.

Next, the post-processing of step ST6 is described.

The parameter calculation part 3 generates restart data used for a CFD analysis process performed again after the time Δt based on the calculated solution vector and outputs the generated restart data, for example, to a primary storage part (not shown) (step ST8).

Further, the parameter calculation part 3 generates visualization data based on the calculated solution vector and outputs the generated visualization data, for example, to the primary storage part (not shown) (step ST9).

Then, the parameter calculation part 3 calculates a statistic and outputs the calculated statistic, for example, to the primary storage part (not shown) (step ST10).

Next, a calculation process of the statistic of step ST10 is described.

The parameter calculation part 3 calculates a L2/inf norm value and outputs the calculated norm value, for example, to the primary storage part (not shown) (step ST11).

The air resistance value calculation part 5 calculates an air resistance value (Cd value) that acts on the object O and outputs the calculated air resistance value (Cd value) to the convergence determination part 6 (step ST12).

The convergence determination part 6 determines, based on the air resistance value (Cd value) calculated by the air resistance value calculation part 5, whether or not the variation in the time direction of the air resistance value (Cd value) has converged (step ST13).

When it is not determined that the air resistance value (Cd value) has converged, the parameter calculation part 3 terminates the process of step ST10 based on the determination result of the convergence determination part 6 and moves on to the process of step ST7.

On the other hand, when it is determined that the air resistance value (Cd value) has converged, the time direction addition and subtraction calculation part 4 starts a calculation of an average value (step ST14).

For example, by use of the plurality of calculation parts 100, the time direction addition and subtraction calculation part 4 performs an addition and subtraction calculation in the time direction of a plurality of air resistance values (Cd values) calculated by the air resistance value calculation part 5 and obtains an average value of the air resistance values (Cd values) based on the calculation result of the addition and subtraction calculation (step ST15).

Further, by use of the plurality of calculation parts 100, the time direction addition and subtraction calculation part 4 performs an addition and subtraction calculation in the time direction of a plurality of solution vectors calculated by the parameter calculation part 3 and obtains an average value of the solution vectors based on the calculation result of the addition and subtraction calculation (step ST16).

Note that, the post-processing of step ST6, the calculation process of the statistic of step ST10, and the average value calculation process of step ST14 may each include a process other than that in the embodiment.

Figure 4:
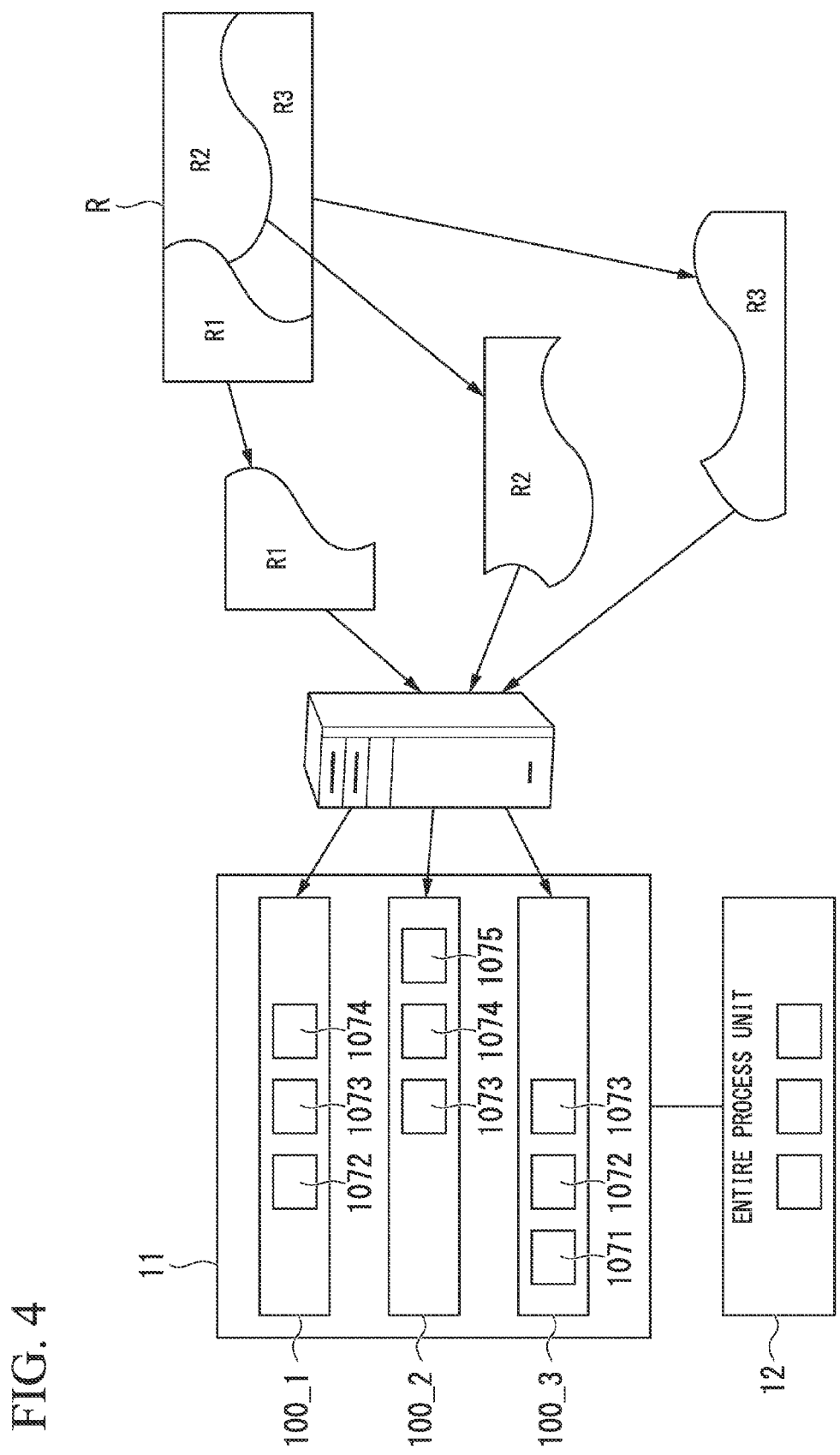
FIG. 4 is a diagram used to describe a process example by the calculation apparatus.

Note that, the calculation region R may be divided into a plurality of calculation regions R1, R2, R3, . . . , and an average value may be calculated for each divided calculation region. FIG. 4 is a diagram used to describe a process example by the calculation apparatus 1 according to the present embodiment.

The calculation apparatus 1 performs a simulation by a parallel processing by use of a computer cluster. The calculation apparatus 1 includes, for example, a plurality of calculation parts 100_1, 100_2, 100_3, . . . . Note that, each of the plurality of calculation parts is a node of the computer cluster.

One of the calculation parts 100_1, 100_2, 100_3, . . . obtains the average value of the air resistance values (Cd values) and the average value of the solution vectors for each of the divided calculation regions R1, R2, R3, . . . .

In the example of FIG. 4, according to the addition and subtraction calculation of the calculation part 100_1, buffer regions 1072 to 1074 store the calculation result. According to the addition and subtraction calculation of the calculation part 100_2, buffer regions 1073 to 1075 store the calculation result. According to the addition and subtraction calculation of the calculation part 100_3, buffer regions 1071 to 1073 store the calculation result.

The entire process unit 12 determines, based on an exponent of the buffer in each of the plurality of the calculation parts 100_1, 100_2, 100_3, . . . , an exponent of an output value acquired from each of the calculation parts. The entire process unit 12 may determine the exponent of the output value based on a predetermined set value or may determine the exponent of the output value based on the buffer region of each calculation part that stores the calculation result. Note that, in the latter case, the entire process unit 12 may determine the exponent of the output value in the order of the number of the buffer regions that store the calculation result being large, in the whole of the plurality of the calculation parts 100_1, 100_2, 100_3, . . . . In the example of FIG. 4, since the calculation result is stored in all the buffer regions 1073 in the whole of the calculation parts 100_1, 100_2, 100_3, . . . , the entire process unit 12 may determine the exponent part of three buffer regions 1071, 1072, 1073 upper than the buffer region 1073 as the exponent part of the output value. In this case, the entire process unit 12 performs an addition and subtraction calculation of information stored in the buffer regions 1071, 1072, 1073 of the calculation parts 100_1, 100_2, 100_3, . . . for each exponent and calculates an average value based on the obtained calculation result.

In such a way, since it is possible to obtain a highly accurate calculation result for each of the divided calculation regions R1, R2, R3, . . . , it is possible to obtain a highly accurate calculation result as the entire process unit 12.

Further, when the entire process unit 12 determines the exponent of the output value, the entire process unit 12 does not accept an input of the calculation result from the plurality of the calculation parts 100_1, 100_2, 100_3, . . . but accepts an input of only identification information of the buffer region that stores the calculation result in each calculation part.

The entire process unit 12 determines the exponent of the output value based on the identification information of the buffer region from the plurality of the calculation parts 100_1, 100_2, 100_3, . . . . The entire process unit 12 transmits information indicating the determined exponent of the output value to each of the calculation parts 100_1, 100_2, 100_3, . . . . The calculation parts 100_1, 100_2, 100_3, . . . read out (extract) a calculation result from the buffer region corresponding to the exponent of the output value from the entire process unit 12 and output the calculation result which is read out, to the entire process unit 12.

For example, when the entire process unit 12 outputs identification information indicating the buffer regions 1072, 1073, 1074 to the calculation parts 100_1, 100_2, 100_3, the calculation part 100_1 reads out a calculation result stored in the buffer regions 1072 to 1074 and outputs the calculation result which is read out, to the entire process unit 12; the calculation part 100_2 reads out a calculation result stored in the buffer regions 1073, 1074 and outputs the calculation result which is read out, to the entire process unit 12; and the calculation part 100_3 reads out a calculation result stored in the buffer regions 1072, 1073 and outputs the calculation result which is read out, to the entire process unit 12.

Thereby, the entire process unit 12 is able to obtain only information of the exponent part required for the output value from the plurality of the calculation parts 100_1, 100_2, 100_3, . . . . Therefore, it is possible to reduce a processing load by the entire process unit 12 and to reduce the amount of information exchanged between the plurality of the calculation parts 100_1, 100_2, 100_3, . . . and the entire process unit 12.

Figure 5:
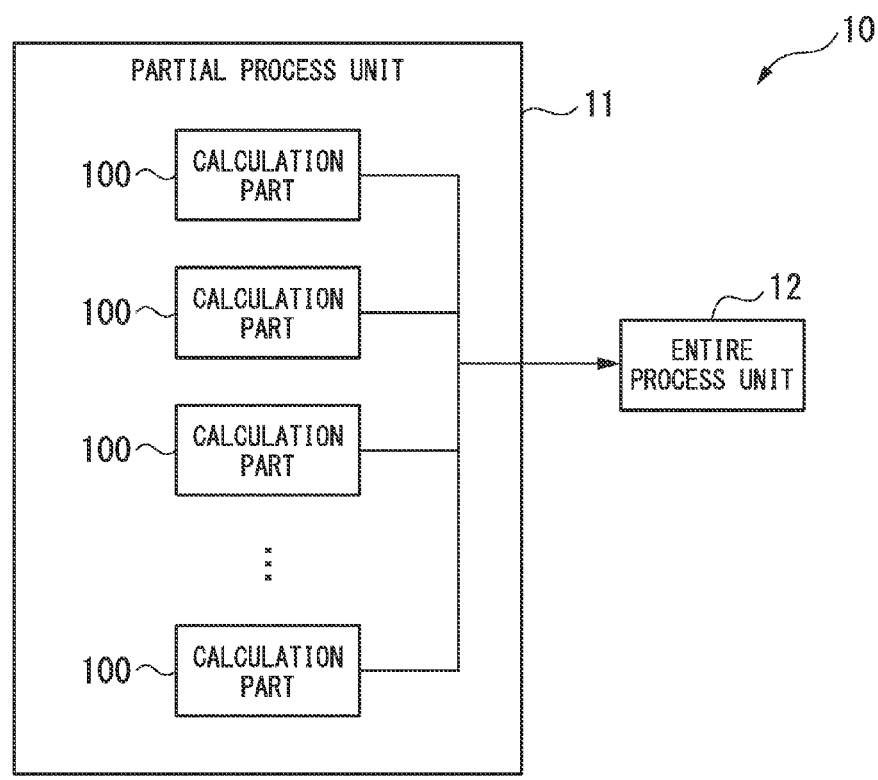
FIG. 5 is a diagram showing an example of a floating-point calculation apparatus.

Next, an example of a floating-point calculation apparatus 10 is described with reference to FIG. 5. FIG. 5 is a diagram showing an example of the floating-point calculation apparatus 10.

The floating-point calculation apparatus 10 includes the entire process unit 12 and a partial process unit 11 that includes the plurality of calculation parts 100. In the embodiment, each of the plurality of calculation parts 100 included in the partial process unit 11 is a configuration having the same function and, for example, is one process substrate. The partial process unit 11 is a computer cluster including the plurality of calculation parts 100 as the process substrate. Each of the plurality of calculation parts 100 is connected to the entire process unit 12 and outputs the calculation result to the entire process unit 12. The entire process unit 12 obtains one calculation result based on outputs from the plurality of calculation parts 100.

Figure 6:
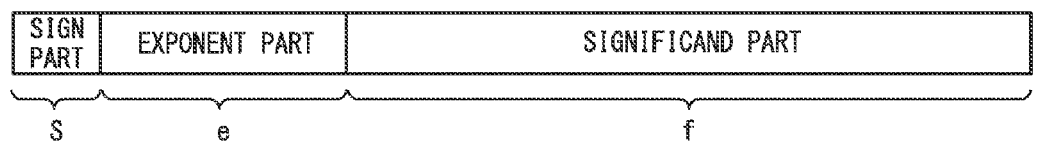
FIG. 6 is a diagram showing an example of a data format of an input value.

Next, an example of an input value input to the calculation part 100 is described with reference to FIG. 6. FIG. 6 is a diagram showing an example of a data format of an input value input to the calculation part 100.

The input value input to the calculation part 100 is, for example, information expressed by a floating-point data format. In the embodiment, the input value is data in the IEEE (Institute of Electrical and Electronics Engineers) form and includes a sign part S, an exponent part e, and a significand part f. Note that, the sign part S is 1 bit, and the bit lengths of the exponent part e and the significand part f are determined depending on a format adopted by the calculation part 100. In the embodiment, all the bit lengths of the exponent part e and the significand part f of the floating-point number processed by the calculation part 100 have the same length.

Note that, when the input value is not the floating-point data format when the value is input to the calculation part 100, the calculation part 100 converts the input value into the floating-point data format and performs a floating-point calculation.

Figure 7:
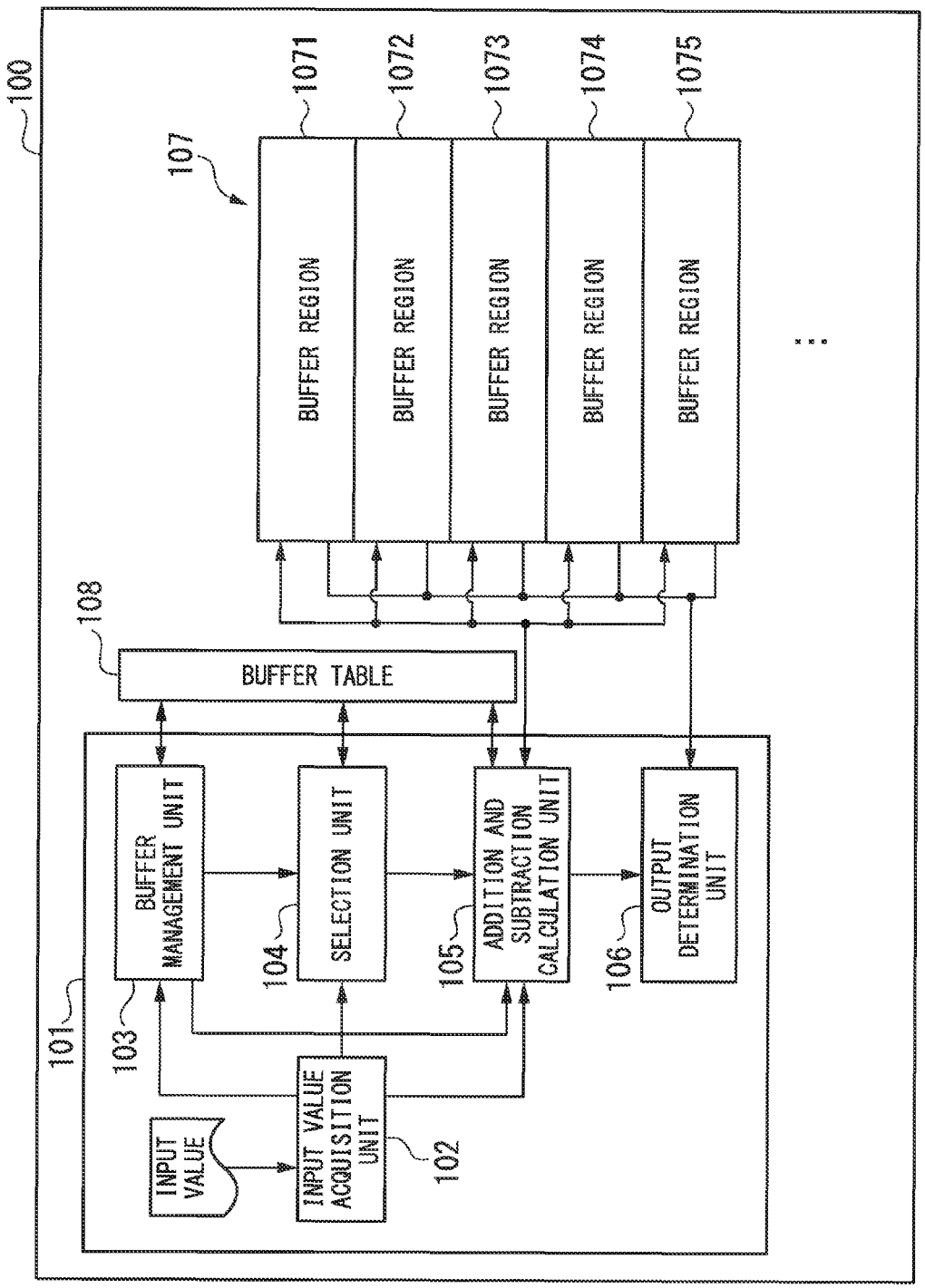
FIG. 7 is a block diagram showing a configuration example of a calculation part.

Next, a configuration example of the calculation part 100 is described with reference to FIG. 7. FIG. 7 is a block diagram showing a configuration example of the calculation part 100.

The calculation part 100 includes a control unit 101, a buffer unit 107, and a buffer table 108. The control unit 101 is, for example, a CPU (Central Processing Unit) and is a control unit that totally controls the operation of the calculation part 100. The calculation part 100 includes an input value acquisition unit 102, a buffer management unit 103, a selection unit 104, an addition and subtraction calculation unit 105, and an output determination unit 106, as functional units that function by the control unit 101 as the CPU performing a program. The functional units in part or in whole may be a hardware functional unit such as an LSI (Large Scale Integration) or an ASIC (Application Specific Integrated Circuit).

In the embodiment, the exponent and the number of significant digits of a numerical value processable by the addition and subtraction calculation unit 105 are determined in advance. Further, the exponent and the number of significant digits of a buffer region formed in the buffer unit 107 are also determined in advance depending on the numerical value processable by the addition and subtraction calculation unit 105. Hereinafter, an exponent that is determined in advance for the buffer region formed in the buffer unit is referred to as a setting exponent. In the buffer unit, for example, buffer regions are prepared, one of the buffer regions corresponding to each of setting exponents "+32", "+16", "+00", "−16", "−32".

The input value acquisition unit 102 acquires an input value and outputs the acquired input value to each of the buffer management unit 103, the selection unit 104, and the addition and subtraction calculation unit 105. The input value acquisition unit 102 may sequentially acquire information output from a configuration unit of a preprocessing as the input value. The input value acquisition unit 102 may sequentially read out one by one and acquire an input value stored in a predetermined storage region.

The buffer management unit 103 manages a buffer region used by the addition and subtraction calculation unit 105 of buffer regions included in the buffer unit 107 with reference to the buffer table 108. When a buffer region of a setting exponent corresponding to the exponent part e of the input value is not prepared, the buffer management unit 103 adds a buffer region of the setting exponent corresponding to the exponent part e of the input value.

The buffer management unit 103 converts (distributes) the input value such that the exponent part e of the input value is within the range of the setting exponent of the buffer and that the number of significant digits of the input value is within the range of the number of significant digits of the buffer with reference to the buffer table 108, and outputs the converted input value to the selection unit 104 and the addition and subtraction calculation unit 105.

For example, when the exponent part e of the input value is not within the range of the setting exponent of the buffer, the buffer management unit 103 converts the input value into a floating-point number in which the exponent part e of the input value becomes the setting exponent of the buffer. When the number of significant digits of the input value after converting the exponent part e becomes out of the range of the number of significant digits of the buffer, the buffer management unit 103 divides the input value into floating-point numbers each having a different exponent part e and converts the input value into numerical values within the range of the setting exponent and the number of significant digits of the buffer.

Specifically, when the exponent part e of the input value is "−15", the buffer management unit 103 determines that the exponent part e of the input value is not within the range of the setting exponent (for example, "+00", "−16") of the buffer. In this case, the buffer management unit 103 converts, based on the significand part f of the input value, the input value into a floating-point number in which the exponent part e becomes "+00" or "−16". For example, when the input value is converted into a floating-point number in which the exponent part e of the input value becomes the setting exponent of the buffer of "−16" and the number of significant digits of the input value after conversion exceeds "16" as the number of significant digits of the buffer, the buffer management unit 103 divides the input value into a value having the exponent part e of "+00" and a value having the exponent part e of "−16" or into a value having the exponent part e of "−16" and a value having the exponent part e of "−32". That is, when the input value extends over the range of the exponent part or the number of significant digits of the buffer, the buffer management unit 103 divides and converts the input value into a floating-point number included within the range of the exponent part in which an addition and subtraction calculation can be performed by the addition and subtraction calculation unit 105.

The selection unit 104 selects, based on the exponent part e of the input value, a buffer region that corresponds to the input value from a plurality of buffer regions 1071 to 1075. In the embodiment, the selection unit 104 reads out an address of the buffer region that corresponds to the exponent part e of the input value with reference to the buffer table 108 and selects one of the buffer regions 1071 to 1075 that corresponds to the address which is read out as the buffer region that corresponds to the exponent part e of the input value.

The addition and subtraction calculation unit 105 writes a result of performing an addition and subtraction calculation based on a value stored in the buffer region selected by the selection unit 104 and the input value acquired by the input value acquisition unit 102 on the buffer region selected by the selection unit 104. When a value has already been stored in the buffer region, the addition and subtraction calculation unit 105 overwrites with the latest calculation result.

The output determination unit 106 determines, based on the value stored in the buffer unit 107, the result of the addition and subtraction calculation based on a plurality of input values. In the embodiment, the bit number of information output by the output determination unit 106 is determined. It is determined that the bit number of information stored in any one of the buffer regions 1071 to 1075 is a bit number of an output value capable of being output by the output determination unit 106. Thus, the output determination unit 106 determines, as an output value, information that is read out from the uppermost buffer region of the buffer regions 1071 to 1075 storing one or more numbers. For example, when the buffer region having the setting exponent of "+00", the buffer region having the setting exponent of "−16", and the buffer region having the setting exponent of "−32" of the buffer regions 1071 to 1075 store a number of one or more, the output determination unit 106 determines, as the output value, information stored in the buffer region having the uppermost setting exponent of "+00", of the setting exponent of "+00", the setting exponent of "−16", and the setting exponent of "−32". Note that, when the information stored in the buffer region having the setting exponent of "+00" is "0", the output determination unit 106 determines, as the output value, the information stored in the buffer region having the secondly upper setting exponent of "−16".

The buffer unit 107 includes the plurality of buffer regions 1071, 1072, 1073, 1074, 1075, . . . each having an allocated buffer address. The plurality of buffer regions 1071, 1072, 1073, 1074, 1075, . . . are, for example, set on a RAM. The buffer regions 1071 to 1075 are sectioned regions each having a predetermined capacity and are buffers each storing one of a plurality of values having a different exponent.

In the embodiment, the capacities of the buffer regions 1071 to 1075 are determined in advance depending on the number of significant digits of data processed by the addition and subtraction calculation unit 105. The buffer region 1071 is a buffer that stores a value having the exponent part e of "+32". The buffer region 1072 is a buffer that stores a value having the exponent part e of "+16". The buffer region 1073 is a buffer that stores a value having the exponent part e of "+00". The buffer region 1074 is a buffer that stores a value having the exponent part e of "−16". The buffer region 1075 is a buffer that stores a value having the exponent part e of "−32".

The buffer table 108 is a table that stores information indicating the setting exponent of the buffer region, the number of significant digits, the address of the allocated region, and the like. The buffer table 108 is set, for example, on a register attached to the CPU of the control unit 101.

Figure 8:
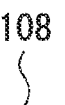
FIG. 8 is a diagram showing an example of a buffer table.

Next, an example of the buffer table 108 is described with reference to FIG. 8. FIG. 8 is a diagram showing an example of the buffer table 108.

The buffer table 108 is, for example, a table that associates and stores information indicating the setting exponent of the buffer, information indicating the number of significant digits of the buffer, and information indicating the address of the buffer.

The setting exponent of the buffer is information indicating the exponent of data stored in each of the buffer regions 1071 to 1075. The setting exponent of the buffer is determined in advance depending on the exponent of the floating-point number calculated by the addition and subtraction calculation unit 105. In the embodiment, the setting exponents of the buffer are "+32", "+16", "+00", "−16", "−32".

The number of significant digits of the buffer is information indicating an upper limit of the number of significant digits of data stored in each of the buffer regions 1071 to 1075. In the embodiment, the upper limit of the number of significant digits of the buffer is "16" in all the buffer regions.

The address of the buffer is information indicating the location of each of the buffer region 1071 to 1075 in the buffer unit 107. When the information indicating the location of the buffer region is registered on the address of the buffer, the registration indicates that the buffer is allocated as a buffer of the addition and subtraction calculation unit 105.

Figure 9:
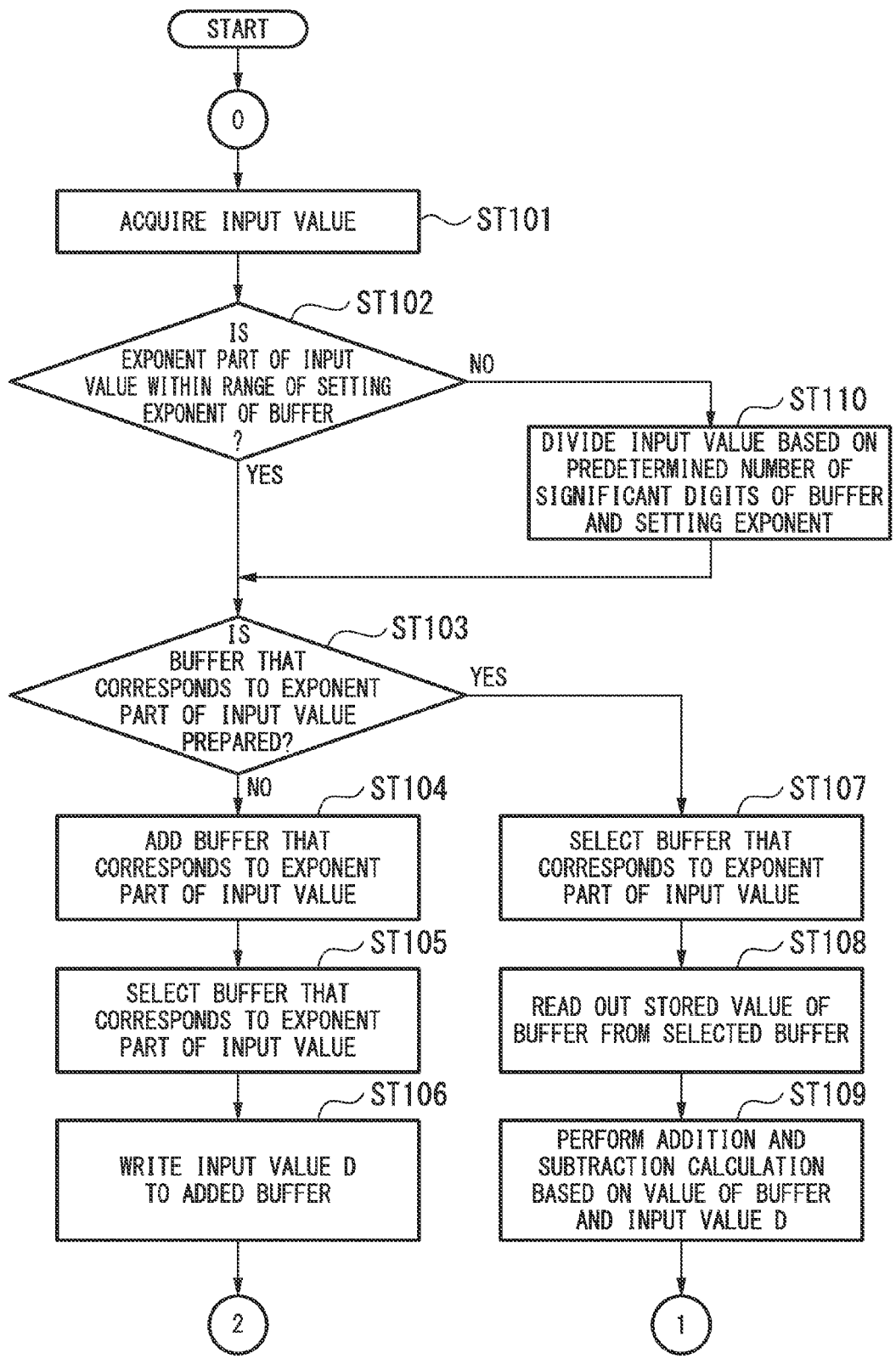
FIG. 9 is a flowchart used to describe a process example by the calculation part.

Next, a process by the calculation part 100 is described with reference to FIG. 9. FIG. 9 is a flowchart used to describe a process example by the calculation part 100.

The input value acquisition unit 102 sequentially acquires an input value (step ST101). The input value acquisition unit 102 outputs the acquired input value to each of the buffer management unit 103, the selection unit 104, and the addition and subtraction calculation unit 105. For example, the input value acquisition unit 102 acquires numerical data D1 (as an example, 1.000100010001000E+00) as an input value and outputs the numerical data D1 to each of the buffer management unit 103, the selection unit 104, and the addition and subtraction calculation unit 105. The numerical data D1 includes information indicating "+" in the sign part S, information indicating "+00" in the exponent part e, and information indicating "1000100010001000" in the significand part f. The number of significant digits of the significand part f is "16 digits".

The buffer management unit 103 determines whether or not the exponent part e of the input value is within the range of the setting exponent of the buffer with reference to the buffer table 108 (step ST102). In the embodiment, the buffer management unit 103 determines whether or not a setting exponent that matches the exponent part e of "+00" of the numerical data D1 as the input value is included in the buffer table 108. The setting exponent of "+00" of the buffer is defined in the buffer table 108. That is, the setting exponent that matches the exponent part e of "+00" of the numerical data D1 is included in the buffer table 108. In this case, the buffer management unit 103 determines that the exponent part e of the numerical data D1 is within the range of the setting exponent of the buffer.

When the buffer management unit 103 determines that the exponent part e of the input value is within the range of the setting exponent of the buffer (step ST102: YES), the buffer management unit 103 determines whether or not a buffer region that corresponds to the exponent part e of the input value is prepared with reference to the buffer table 108 (step ST103). In the embodiment, the buffer management unit 103 determines whether or not the address of the buffer is associated with the setting exponent of the buffer table 108 that matches the exponent part e of "+00" of the numerical data D1. It is assumed that the address of the buffer region having the setting exponent of "+00" of the buffer is not written on the buffer table 108. In this case, it is indicated that the address of the buffer that corresponds to the setting exponent of "+00" is not prepared in the buffer table 108. Therefore, the buffer management unit 103 determines that the buffer region that corresponds to the exponent part e of the numerical data D1 as the input value is not prepared.

When the buffer management unit 103 determines that the buffer region that corresponds to the exponent part e of the input value is not prepared (step ST103: NO), the buffer management unit 103 adds a buffer region that corresponds to the exponent part e of the numerical data D1 as the input value (step ST104). The buffer management unit 103 allocates, based on the exponent part e of the numerical data D1, a buffer region for the exponent part e of the numerical data D1 and writes the address of the allocated buffer on the buffer table 108. In the embodiment, the buffer management unit 103 allocates the buffer region 1073 as the buffer region for the exponent part e of "+00" of the numerical data D1. The buffer management unit 103 writes information indicating the address of the buffer region 1073 allocated as the buffer region for the exponent part e of the numerical data D1 in a column of the address of the buffer that corresponds to the setting exponent of "+00" in the buffer table 108. Thereby, the buffer region 1073 that corresponds to the exponent part e of "+00" of the input value is added.

The buffer management unit 103 notifies the selection unit 104 of the buffer region that corresponds to the setting exponent of "+00" being added.

The selection unit 104 reads out the address of the buffer region that corresponds to the exponent part e of the input value with reference to the buffer table 108 and selects a buffer address that corresponds to the exponent part e of the input value (step ST105). When the address of the buffer region that corresponds to the exponent part e of the input value is not registered, after the selection unit 104 receives the notification of a buffer region being added from the buffer management unit 103, the selection unit 104 reads out the address of the buffer region that corresponds to the exponent part e of the input value with reference to the buffer table 108 and selects the buffer region 1073 that corresponds to the exponent part e of the input value. The selection unit 104 outputs information indicating the selected buffer region 1073 to the addition and subtraction calculation unit 105.

The addition and subtraction calculation unit 105 writes the numerical data D1 in the buffer region 1073 selected by the selection unit 104 (step ST106).

Next, the input value acquisition unit 102 acquires numerical data D2 (as an example, 2.000200020002000E+00) as an input value and outputs the acquired numerical data D2 to each of the buffer management unit 103, the selection unit 104, and the addition and subtraction calculation unit 105. The numerical data D2 includes information indicating "+" in the sign part S, information indicating "+00" in the exponent part e, and information indicating "2000200020002000" in the significand part f. The number of significant digits of the significand part f is "16 digits".

As described above, the buffer management unit 103 has added the buffer region 1073 having the setting exponent of "+00" at the time of storing the numerical data D1.

Accordingly, in the determination of step ST103, the buffer management unit 103 determines that the buffer region 1073 that corresponds to the exponent part e of "+00" of the numerical data D2 is prepared (step ST103: YES). The buffer management unit 103 outputs the determination result to the selection unit 104.

When it is determined that the buffer region 1073 that corresponds to the exponent part e of "+00" of the numerical data D2 is prepared, the selection unit 104 reads out the address of the buffer region that corresponds to the exponent part e of "+00" of the input value with reference to the buffer table 108 and selects the buffer region 1073 that corresponds to the exponent part e of the input value (step ST107). The selection unit 104 outputs information indicating the selected buffer region 1073 to the addition and subtraction calculation unit 105.

The addition and subtraction calculation unit 105 reads out a stored value of the buffer from the buffer region 1073 selected by the selection unit 104 (step ST108). In the embodiment, since the numerical data D1 is stored in the buffer region 1073, the addition and subtraction calculation unit 105 reads out the numerical data D1.

Then, the addition and subtraction calculation unit 105 performs an addition and subtraction calculation based on the numerical data D1 that is read out and the numerical data D2 that is the input value (step ST109). In the embodiment, the addition and subtraction calculation unit 105 adds the numerical data D1 and the numerical data D2 and obtains a calculation result (D1+D2=3.000300030003000E+00).

When it is determined in step ST102 that the exponent part e of the input value is not within the range of the setting exponent of the buffer (step ST102: NO), the buffer management unit 103 converts the input value such that the exponent part e of the input value is within the range of the setting exponent of the buffer and that the number of significant digits of the input value is within the range of the number of significant digits of the buffer with reference to the buffer table 108, and outputs the converted input value to the selection unit 104 and the addition and subtraction calculation unit 105 (step ST110). When the exponent part e of the input value is not within the range of the setting exponent of the buffer, the buffer management unit 103 converts the input value into a floating-point number in which the exponent part e of the input value becomes the setting exponent of the buffer. When the number of significant digits of the input value after the conversion of the exponent part e is out of the range of the number of significant digits of the buffer, the buffer management unit 103 divides the input value into values each having a different exponent part e and converts the input value into numerical values within the range of the setting exponent and the number of significant digits of the buffer.

Figure 10:
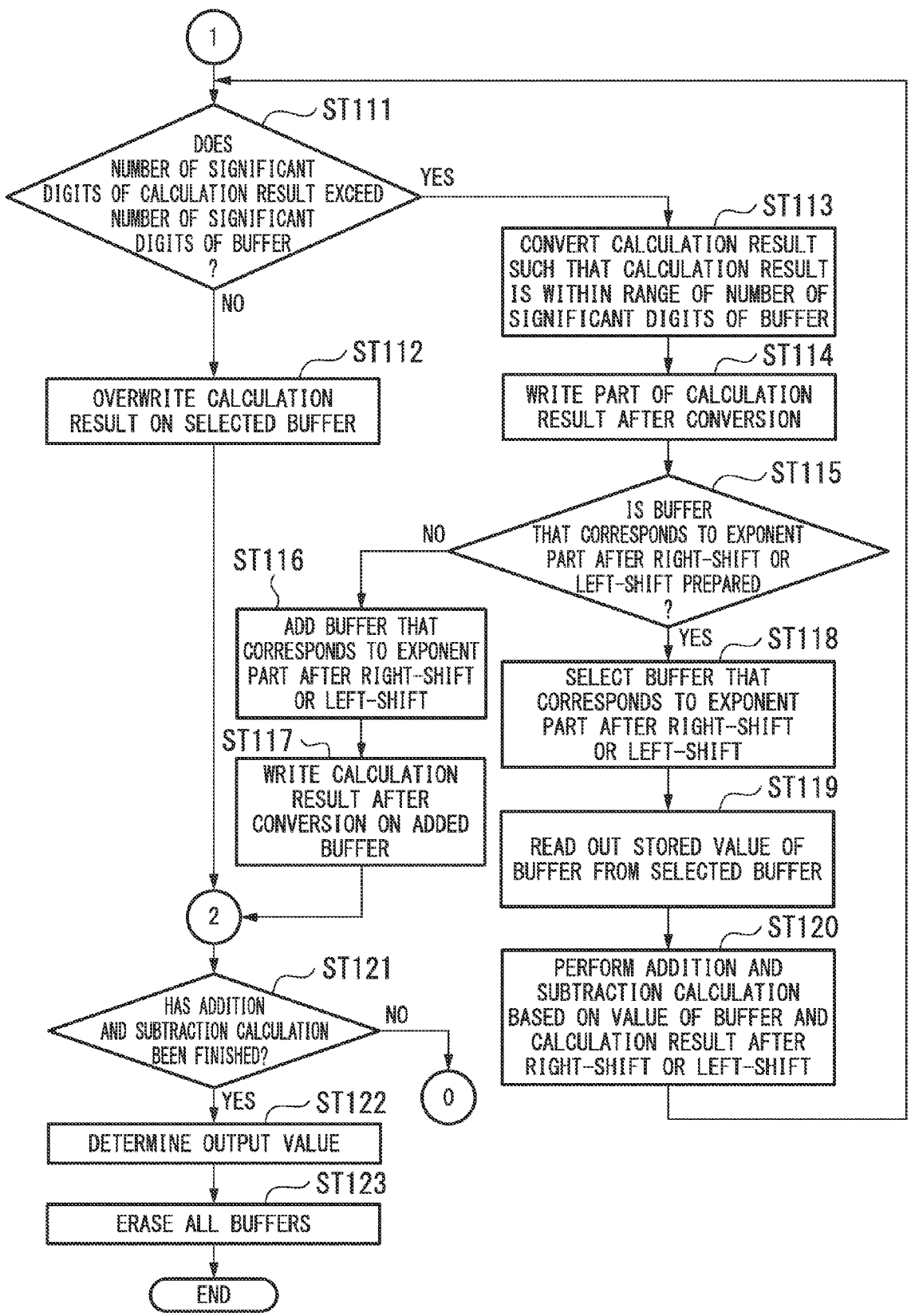
FIG. 10 is a flowchart used to describe a continuation of the process example shown in FIG. 9.

Next, a continuation of the process by the calculation part 100 is described with reference to FIG. 10. FIG. 10 is a flowchart used to describe the continuation of the process example shown in FIG. 9.

After the process of step ST109, the addition and subtraction calculation unit 105 determines whether or not the number of significant digits of the calculation result exceeds the number of significant digits of the buffer with reference to the buffer table 108 (step ST111). In the embodiment, the addition and subtraction calculation unit 105 obtains the number of significant digits of "16" of the buffer region 1073 selected by the selection unit 104 in step ST107 with reference to the buffer table 108. The addition and subtraction calculation unit 105 determines whether or not the number of significant digits of the calculation result exceeds the number of significant digits of "16" of the buffer region 1073. Since the number of significant digits of the calculation result (D1+D2=3.000300030003000E+00) is "16", the addition and subtraction calculation unit 105 determines that the number of significant digits of the calculation result does not exceed the number of significant digits of "16" of the buffer region 1073.

When it is determined that the number of significant digits of the calculation result does not exceed the number of significant digits of the buffer (step ST111: NO), the addition and subtraction calculation unit 105 overwrites the calculation result (3.000300030003000E+00) on the buffer region 1073 (step ST112).

Next, it is assumed that the input value acquisition unit 102 acquires numerical data D3 (as an example, 7.000700070007000E+00) as an input value and outputs the acquired numerical data D3 to each of the buffer management unit 103, the selection unit 104, and the addition and subtraction calculation unit 105. The numerical data D3 includes information indicating "+" in the sign part S, information indicating "+00" in the exponent part e, and information indicating "7000700070007000" in the significand part f. The number of significant digits of the significand part f is "16".

As described above, the buffer region 1073 having the setting exponent of "+00" has been added by the selection unit 104 at the time of storing the numerical data D1. Accordingly, in the determination of step ST103, the selection unit 104 determines that the buffer region 1073 that corresponds to the exponent part e of "+00" of the numerical data D3 is prepared (step ST103: YES). Then, the selection unit 104 selects the buffer region 1073 having the setting exponent of "+00" (step ST107).

Next, the addition and subtraction calculation unit 105 reads out a stored value of the buffer from the buffer region 1073 selected by the selection unit 104 (step ST108). In the embodiment, since the calculation result of the numerical data D1+D2 is stored in the buffer region 1073, the addition and subtraction calculation unit 105 reads out the calculation result (D1+D2).

Then, the addition and subtraction calculation unit 105 performs an addition and subtraction calculation based on the calculation result (D1+D2) that is read out and the numerical data D3 that is the input value (step ST109). In the embodiment, the addition and subtraction calculation unit 105 adds the calculation result (D1+D2) and the numerical data D3 and obtains a calculation result A (D1+D2+D3=10.001000100010000E+00).

The addition and subtraction calculation unit 105 determines whether or not the number of significant digits of the calculation result exceeds the number of significant digits of the buffer with reference to the buffer table 108 (step ST111). In the embodiment, since the number of significant digits of the calculation result A (D1+D2+D3=10.001000100010000E+00) is "17", the addition and subtraction calculation unit 105 determines that the number of significant digits of the calculation result exceeds the number of significant digits of "16" of the buffer region 1073.

When it is determined that the number of significant digits of the calculation result exceeds the number of significant digits of the buffer (step ST111: YES), the addition and subtraction calculation unit 105 converts the calculation result A (10.001000100010000E+00) into a value within the range of the number of significant digits of the buffer (step ST113). In the embodiment, the addition and subtraction calculation unit 105 shifts right or shifts left a value that is out of the range of the setting exponent and the number of significant digits of the buffer, of values that constitute the calculation result A (10.001000100010000E+00), and thereby divides the calculation result A (10.001000100010000E+00) into data having the exponent part e after the right-shift or after the left-shift and data having the exponent part e before the right-shift or before the left-shift.

Specifically, the addition and subtraction calculation unit 105 divides the calculation result A (10.001000100010000E+00) into a calculation result A1 (10.000000000000000E+00) that is a value out of the range of the setting exponent and the number of significant digits of the buffer and a calculation result A2 (0.001000100010000E+00) that is a value within the range of the setting exponent and the number of significant digits of the buffer. Note that, the addition and subtraction calculation unit 105 determines, based on the exponent part e of the calculation result A and the setting exponent of the buffer, the calculation result A1 that is the value out of the range of the number of significant digits of the buffer of the calculation result A. Further, the addition and subtraction calculation unit 105 shifts right the calculation result A1 (10.000000000000000E+00) that is the value out of the range of the number of significant digits of the buffer to a value that corresponds to the upper setting exponent, and converts the calculation result A1 into a calculation result A1' (0.000000000000001E+16) that is a value after the right-shift. That is, the addition and subtraction calculation unit 105 converts the calculation result A (10.001000100010000E+00) into the calculation result A1' (0.000000000000001E+16) that corresponds to the exponent part e of "+16" after the right-shift and the calculation result A2 (0.001000100010000E+00) that corresponds to the exponent part e of "+00" before the right-shift.

Then, the addition and subtraction calculation unit 105 overwrites the calculation result A2 (0.001000100010000E+00) that corresponds to the exponent part e of "+00" before the right-shift or before the left-shift on the buffer region 1073 having the setting exponent of "+00" (step ST114).

Next, the buffer management unit 103 determines whether or not a buffer region that corresponds to the setting exponent of "+00" after the right-shift or after the left-shift is prepared with reference to the buffer table 108 (step ST115). In the embodiment, the buffer management unit 103 determines whether or not the address of the buffer is associated with the setting exponent of the buffer table 108 that matches the exponent part e of "+16" of the calculation result A1' after the right-shift. It is assumed that the address of the buffer region having the setting exponent of "+16" of the buffer is not defined by the buffer table 108. In this case, it is indicated that the buffer region that corresponds to the exponent part e of "+16" is not prepared in the buffer table 108. Therefore, the selection unit 104 determines that the buffer region that corresponds to the exponent part e of "+16" of the calculation resultA1' (0.000000000000001E+16) after the right-shift is not prepared.

When the buffer management unit 103 determines that the buffer region that corresponds to the exponent part e of the calculation result is not prepared (step ST115: NO), the buffer management unit 103 adds a buffer region that corresponds to the exponent part e of the calculation result (step ST116). The buffer management unit 103 allocates, based on the exponent part e of "+16" of the calculation result A1' (0.000000000000001E+16), a buffer region that corresponds to the exponent part e of the calculation result A1' and writes the address of the allocated buffer region on the buffer table 108. In the embodiment, the buffer management unit 103 allocates the buffer region 1072 as the buffer region for the exponent part e of "+16" of the calculation result A1' (0.000000000000001E+16). The buffer management unit 103 writes information indicating the address of the buffer region 1072 allocated as the buffer region for the exponent part e of "+16" of the calculation result A1' (0.000000000000001E+16) in a column of the address of the buffer that corresponds to the setting exponent of "+16" in the buffer table 108. Thereby, the buffer region 1072 that corresponds to the exponent part e of "+16" of the input value is added.

Then, the addition and subtraction calculation unit 105 writes the calculation result A1' (0.000000000000001E+16) on the added buffer region 1072 (step ST117). On the other hand, when it is determined, in the determination of step ST115, that the buffer region that corresponds to the exponent part e after the right-shift or after the left-shift is prepared (step ST115: YES), the selection unit 104 selects a buffer that corresponds to the exponent part e after the right-shift or after the left-shift (step ST118).

Next, the addition and subtraction calculation unit 105 reads out a stored value of the buffer from the buffer region 1073 selected by the selection unit 104 (step ST119).

Then, the addition and subtraction calculation unit 105 performs an addition and subtraction calculation based on the value of the buffer that is read out and the calculation result after the right-shift or after the left-shift (step ST120).

The calculation part 100 returns to step ST111 and determines whether or not the number of significant digits of the calculation result calculated in step ST120 exceeds the number of significant digits of the buffer.

The addition and subtraction calculation unit 105 repeats the above-described process based on a plurality of input values and determines whether or not the addition and subtraction calculation of all the input values has been finished (step ST121).

When it is determined that the addition and subtraction calculation of all the input values has been finished (step ST121: YES), the addition and subtraction calculation unit 105 notifies the output determination unit 106 of the end of the addition and subtraction calculation process. Thereby, the output determination unit 106 determines an output value based on information stored in the buffer unit 107 and outputs the determined output value to the entire process unit 12 (step ST122).

Then, the output determination unit 106 erases all the data of the buffer unit 107 (step ST123).

Example 1

Figure 11:
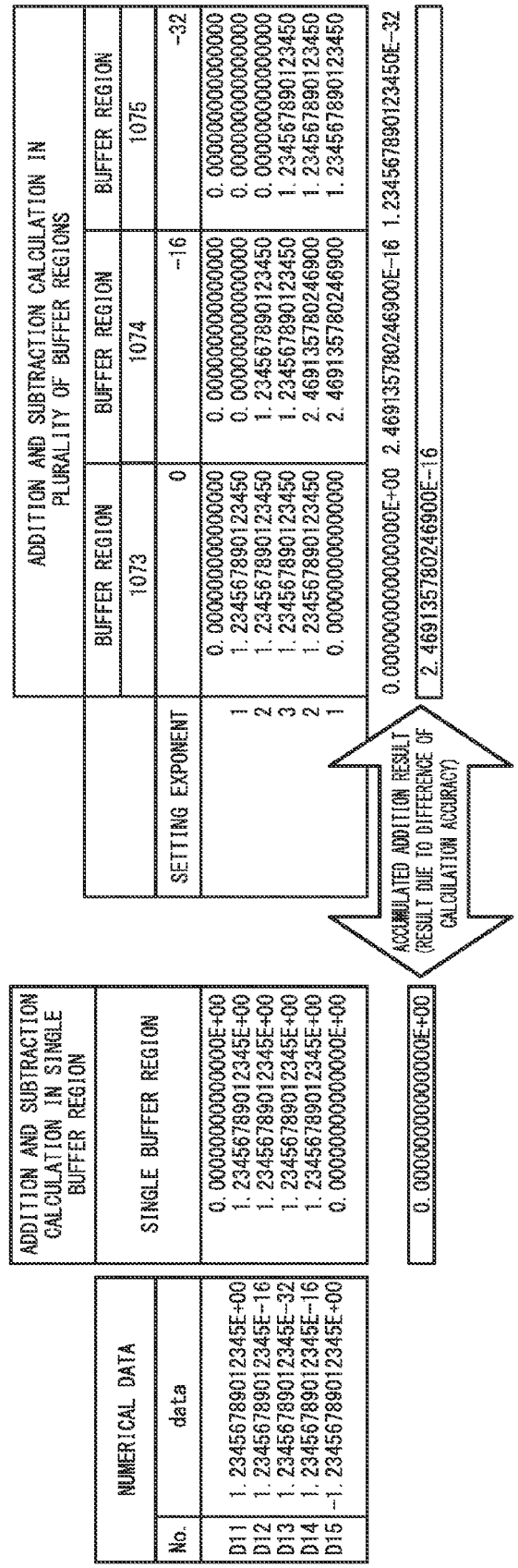
FIG. 11 is a reference diagram used to describe Example 1 by the calculation part.

Next, Example 1 by the calculation part 100 is described with reference to FIG. 11. FIG. 11 is a reference diagram used to describe Example 1 by the calculation part 100. Example 1 is described using an example in which numerical data D11 to D15 are acquired in this order by the input value acquisition unit 102 in a state where there has been no input value.

First, the input value acquisition unit 102 acquires, for example, the numerical data D11 (1.23456789012345E+00) as an input value. The buffer management unit 103 adds the buffer region 1073 as a buffer region that corresponds to the setting exponent of "+00" based on the exponent part e of "+00" of the numerical data D11. The selection unit 104 selects the buffer region 1073 having the setting exponent of "+00" added by the buffer management unit 103 with reference to the buffer table 108 and outputs the selection result to the addition and subtraction calculation unit 105. Then, the addition and subtraction calculation unit 105 writes the significand part f (1.234567890123450) of the numerical data D11 in the buffer region 1073 selected by the selection unit 104.

Next, the input value acquisition unit 102 acquires, for example, the numerical data D12 (1.23456789012345E−16) as an input value. The buffer management unit 103 adds the buffer region 1074 as a buffer region that corresponds to the setting exponent of "−16" based on the exponent part e of "−16" of the numerical data D12. The selection unit 104 selects the buffer region 1074 having the setting exponent of "−16" added by the buffer management unit 103 with reference to the buffer table 108 and outputs the selection result to the addition and subtraction calculation unit 105. Then, the addition and subtraction calculation unit 105 writes the significand part f (1.234567890123450) of the numerical data D12 in the buffer region 1074 selected by the selection unit 104.

Further, the input value acquisition unit 102 acquires, for example, the numerical data D13 (1.23456789012345E−32) as an input value. The buffer management unit 103 adds the buffer region 1075 as a buffer region that corresponds to the setting exponent of "−32" based on the exponent part e of "−32" of the numerical data D13. The selection unit 104 selects the buffer region 1075 having the setting exponent of "−32" added by the buffer management unit 103 with reference to the buffer table 108 and outputs the selection result to the addition and subtraction calculation unit 105. Then, the addition and subtraction calculation unit 105 writes the significand part f (1.234567890123450) of the numerical data D13 in the buffer region 1075 selected by the selection unit 104.

Next, the input value acquisition unit 102 acquires, for example, the numerical data D14 (1.23456789012345E−16) as an input value. The selection unit 104 selects, based on the exponent part e of "−16", the buffer region 1074 having the setting exponent of "−16" with reference to the buffer table 108 and outputs the selection result to the addition and subtraction calculation unit 105. Then, the addition and subtraction calculation unit 105 overwrites a calculation result (2.469135780246900) obtained by performing a calculation (that is, addition) of the value (1.234567890123450) stored in the buffer region 1074 selected by the selection unit 104 and the significand part f (1.234567890123450) of the numerical data D14 in accordance with the sign part S (+) of the numerical data D14, on the buffer region 1074.

Further, the input value acquisition unit 102 acquires, for example, the numerical data D15 (−1.23456789012345E+00) as an input value. The selection unit 104 selects, based on the exponent part e of "+00", the buffer region 1073 having the setting exponent of "+00" with reference to the buffer table 108 and outputs the selection result to the addition and subtraction calculation unit 105. Then, the addition and subtraction calculation unit 105 overwrites a calculation result (0.000000000000000) obtained by performing a calculation (that is, subtraction) of the value (1.234567890123450) stored in the buffer region 1073 selected by the selection unit 104 and the significand part f (1.234567890123450) of the numerical data D15 in accordance with the sign part S (−) of the numerical data D15, on the buffer region 1073.

Then, the output determination unit 106 determines an output value based on information stored in the buffer regions 1073 to 1075. In the embodiment, the output determination unit 106 outputs an output value (2.469135780246900E−16) based on information stored in the buffer region 1074.

On the other hand, in a case not according to the embodiment of the present invention, the value having the exponent part e of "−16" and the value having the exponent part e of "−32" are smaller values than the value having the exponent part e of "+00" and therefore may be truncated as an error. In this case, the result of performing addition or subtraction of the numerical data D11 to D15 becomes (0.0000000000000E+00).

As shown in Example 1, the calculation part 100 stores an addition and subtraction result of the input values in each of the buffer regions, one of the buffer regions corresponding to a different setting exponent, and is able to obtain a final calculation result. Therefore, the calculation part 100 is able to obtain, as a calculation result, even a small value that may be deleted as an error.

Example 2

Figure 12:
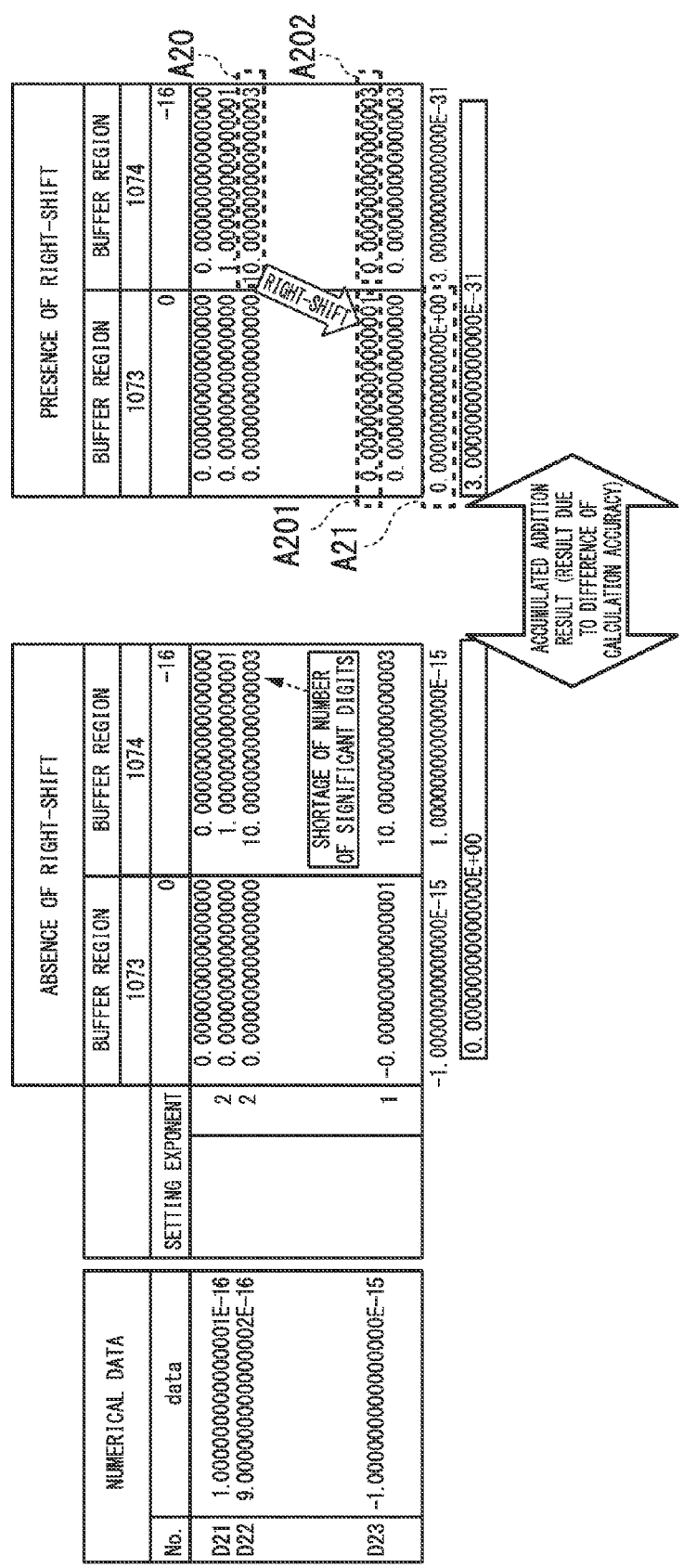
FIG. 12 is a reference diagram used to describe Example 2 by the calculation part.

Next, Example 2 by the calculation part 100 is described with reference to FIG. 12. FIG. 12 is a reference diagram used to describe Example 2 by the calculation part 100. Example 2 is described using an example in which numerical data D21 to D23 are acquired in this order by the input value acquisition unit 102 in a state where there has been no input value.

First, the input value acquisition unit 102 acquires, for example, the numerical data D21 (1.000000000000001E−16) as an input value. The buffer management unit 103 adds the buffer region 1074 as a buffer region that corresponds to the setting exponent of "−16" based on the exponent part e of "−16" of the numerical data D21. The selection unit 104 selects the buffer region 1074 having the setting exponent of "−16" added by the buffer management unit 103 with reference to the buffer table 108 and outputs the selection result to the addition and subtraction calculation unit 105. Then, the addition and subtraction calculation unit 105 writes the significand part f (1.000000000000001) of the numerical data D21 in the buffer region 1074 selected by the selection unit 104.

Next, the input value acquisition unit 102 acquires, for example, the numerical data D22 (9.000000000000002E−16) as an input value. The selection unit 104 selects, based on the exponent part e of "−16", the buffer region 1074 having the setting exponent of "−16" with reference to the buffer table 108 and outputs the selection result to the addition and subtraction calculation unit 105. Then, the addition and subtraction calculation unit 105 reads out the value (1.000000000000001) stored in the buffer region 1074 selected by the selection unit 104 and obtains a calculation result A20 (10.000000000000003) obtained by performing a calculation (that is, addition) of the value that is read out and the significand part f (9.000000000000002) of the numerical data D22 in accordance with the sign part S (+) of the numerical data D22.

The number of significant digits of "+17" of the calculation result A20 (10.000000000000003) exceeds the number of significant digits of "16" of the buffer region 1074. Therefore, the addition and subtraction calculation unit 105 converts the calculation result A20 (10.000000000000003) such that the calculation result A20 is within the range of the number of significant digits of the buffer. In the embodiment, the addition and subtraction calculation unit 105 shifts right a value that is out of the range of the number of significant digits of the buffer, of values that constitute the calculation result A20 (10.000000000000003), and thereby divides the calculation result A20 (10.000000000000003) into a value A201 (0.000000000000001E+00) as data having the exponent part e of "+00" after the right-shift and a value A202 (0.000000000000003E−16) as data having the exponent part e of "−16" before the right-shift.

Then, the addition and subtraction calculation unit 105 overwrites the significand part f (0.000000000000003) of the value A202 (0.000000000000003E−16) on the buffer region 1074 having the setting exponent of "−16". Further, the addition and subtraction calculation unit 105 writes the significand part f (0.000000000000001) of the value A201 (0.000000000000001E+00) in the buffer region 1073 having the setting exponent of "+00".

Next, the input value acquisition unit 102 acquires, for example, the numerical data D23 (−1.000000000000000E−15) as an input value. Since the exponent part e of the numerical data D23 (−1.000000000000000E−15) is "−15", the buffer management unit 103 determines that the exponent part e of the numerical data D23 is not within the range of the setting exponent of the buffer. In this case, the buffer management unit 103 converts the numerical data D23 such that the exponent part e of the numerical data D23 is within the range of the setting exponent of the buffer. In the embodiment, the buffer management unit 103 sets the exponent part e of the numerical data D23 (−1.000000000000000E−15) to "+00" and converts the numerical data D23 (−1.000000000000000E−15) into the numerical data D23 (−0.000000000000001E+00). Then, the selection unit 104 selects the buffer region 1073 having the exponent part e of "+00" of the numerical data D23 with reference to the buffer table 108 and outputs the selection result to the addition and subtraction calculation unit 105. The addition and subtraction calculation unit 105 reads out the value (0.000000000000001) stored in the buffer region 1073 selected by the selection unit 104 and overwrites a calculation result A21 (0.000000000000000) obtained by performing a calculation (for example, subtraction) of the value that is read out and the significand part f (0.000000000000001) of the numerical data D23 after conversion in accordance with the sign part S (−) of the numerical data D23, on the buffer region 1073.

Then, the output determination unit 106 determines an output value based on the information stored in the buffer regions 1073 to 1074. In the embodiment, the output determination unit 106 outputs an output value (3.00000000000000E−31) based on the information stored in the buffer region 1074.

On the other hand, when the right-shift to the buffer region having the upper setting exponent in a case where the calculation result exceeds the number of significant digits of the buffer region as shown in Example 2 is not performed, part of information of a value that exceeds the number of significant digits of the buffer region is not stored in the buffer region. In the example of FIG. 12, there is a case in which part of information (0.000000000000003E−16) of the buffer region having the setting exponent of "−16" may be truncated. In this case, the result of performing addition or subtraction of the numerical data D21 to D23 becomes (0.00000000000000E+00).

As shown in Example 2, the calculation part 100 stores an addition and subtraction result of input values in each of the buffer regions that corresponds to the setting exponent and is able to perform the right-shift to the buffer region having an upper setting exponent when the calculation result of each buffer region exceeds the number of significant digits of the buffer region. Therefore, the calculation part 100 is able to store in the buffer region, as a calculation result, even a value that cannot match the number of significant digits of the buffer region. Accordingly, it is possible to further enhance the accuracy of the calculation result.

Example 3

Figure 13:
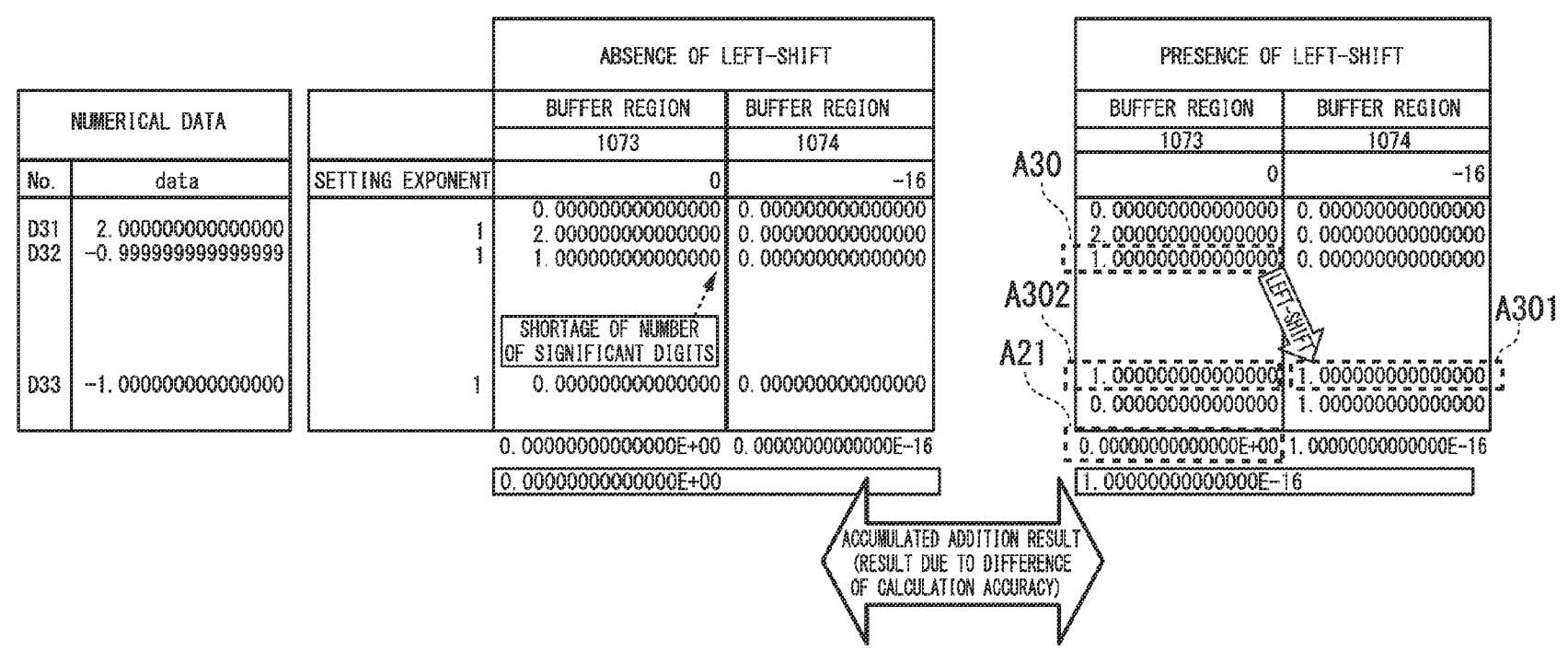

Next, Example 3 by the calculation part 100 is described with reference to FIG. 13. FIG. 13 is a reference diagram used to describe Example 3 by the calculation part 100. Example 3 is described using an example in which numerical data D31 to D33 are acquired in this order by the input value acquisition unit 102 in a state where there has been no input value.

First, the input value acquisition unit 102 acquires, for example, the numerical data D31 (2.000000000000000) as an input value. The buffer management unit 103 converts the numerical data D31 into a value having a floating-point format indicated by an exponent that corresponds to the buffer region with reference to the buffer table 108. That is, the buffer management unit 103 converts the numerical data D31 (2.000000000000000) into the numerical data D31 (2.000000000000000E+00). The buffer management unit 103 adds the buffer region 1073 as a buffer region that corresponds to the setting exponent of "+00" based on the exponent part e of "+00" of the numerical data D31. The selection unit 104 selects the buffer region 1073 having the setting exponent of "+00" added by the buffer management unit 103 with reference to the buffer table 108 and outputs the selection result to the addition and subtraction calculation unit 105. Then, the addition and subtraction calculation unit 105 writes the significand part f (2.000000000000000) of the numerical data D31 in the buffer region 1073 selected by the selection unit 104.

Next, the input value acquisition unit 102 acquires, for example, the numerical data D32 (−0.999999999999999) as an input value. The buffer management unit 103 converts the numerical data D32 into a value having a floating-point format indicated by an exponent that corresponds to the buffer region with reference to the buffer table 108. That is, the buffer management unit 103 converts the numerical data D32 (−0.999999999999999) into the numerical data D32 (−0.999999999999999E+00). The selection unit 104 selects the buffer region 1073 having the setting exponent of "+00" based on the exponent part e of "+00" with reference to the buffer table 108 and outputs the selection result to the addition and subtraction calculation unit 105. Then, the addition and subtraction calculation unit 105 reads out the value (2.000000000000000) stored in the buffer region 1073 selected by the selection unit 104 and obtains a calculation result A30 (1.000000000000001) obtained by performing a calculation (that is, subtraction) of the value that is read out and the significand part f (0.999999999999999) of the numerical data D32 in accordance with the sign part S (−) of the numerical data D32.

The number of significant digits of "17" of the calculation result A30 (1.000000000000001) exceeds the number of significant digits of "16" of the buffer region 1073. Therefore, the addition and subtraction calculation unit 105 converts the calculation result A30 (1.000000000000001) such that the calculation result A30 is within the range of the number of significant digits of the buffer. In the embodiment, the addition and subtraction calculation unit 105 shifts left a value that is out of the range of the number of significant digits of the buffer, of values that constitute the calculation result A30 (1.000000000000001), and thereby divides the calculation result A30 (1.000000000000001) into a value A301 (1.000000000000000E−16) as data having the exponent part e of "−16" after the left-shift and a value A302 (1.000000000000000E+00) as data having the exponent part e of "+00" before the left-shift.

Then, the addition and subtraction calculation unit 105 overwrites the significand part f (1.000000000000000) of the value A302 (1.000000000000000E+00) on the buffer region 1073 having the setting exponent of "+00". Further, the addition and subtraction calculation unit 105 writes the significand part f (1.000000000000000) of the value A301 (1.000000000000000E−16) in the buffer region 1074 having the setting exponent of "−16".

Next, the input value acquisition unit 102 acquires, for example, the numerical data D33 (−1.000000000000000) as an input value. The buffer management unit 103 converts the numerical data D33 into a value having a floating-point format indicated by an exponent that corresponds to the buffer region with reference to the buffer table 108. That is, the buffer management unit 103 converts the numerical data D33 (−1.000000000000000) into the numerical data D32 (−1.000000000000000E+00). The selection unit 104 selects the buffer region 1073 having the exponent part e of "+00" of the numerical data D33 with reference to the buffer table 108 and outputs the selection result to the addition and subtraction calculation unit 105. The addition and subtraction calculation unit 105 reads out the value (1.000000000000000) stored in the buffer region 1073 selected by the selection unit 104 and overwrites a calculation result A31 (0.000000000000000) obtained by performing a calculation (for example, subtraction) of the value that is read out and the significand part f (1.000000000000000) of the numerical data D33 after conversion in accordance with the sign part S (−) of the numerical data D33, on the buffer region 1073.

Then, the output determination unit 106 determines an output value based on the information stored in the buffer regions 1073 to 1074. In the embodiment, the output determination unit 106 outputs an output value (1.000000000000000E−16) based on the information stored in the buffer region 1074.

On the other hand, when the left-shift to the buffer region having the lower setting exponent in a case where the calculation result exceeds the number of significant digits of the buffer region as shown in Example 3 is not performed, part of information of a value that exceeds the number of significant digits of the buffer region is not stored in the buffer region. In the example of FIG. 13, there is a case in which part of information (0.000000000000001E+00) of the buffer region having the setting exponent of "+00" may be truncated. In this case, the result of performing addition or subtraction of the numerical data D31 to D33 becomes (0.000000000000000E+00).

As shown in Example 3, the calculation part 100 stores an addition and subtraction result of input values in each of the buffer regions that corresponds to the setting exponent and is able to perform the left-shift to the buffer region having an lower setting exponent when the calculation result of each buffer region exceeds the number of significant digits of the buffer region. Therefore, the calculation part 100 is able to store in the buffer region, as a calculation result, even a value that cannot match the number of significant digits of the buffer region. Accordingly, it is possible to further enhance the accuracy of the calculation result.

Example 4

Next, Example 4 by the calculation part 100 is described with reference to FIG. 14. FIG. 14 is a reference diagram used to describe Example 4 by the calculation part 100. Example 4 is described using an example in which numerical data D41 to D43 are acquired in this order by the input value acquisition unit 102 in a state where there has been no input value.

First, the input value acquisition unit 102 acquires, for example, the numerical data D41 (1.00000000000001E−16) as an input value. The buffer management unit 103 adds the buffer region 1074 as a buffer region that corresponds to the setting exponent of "−16" based on the exponent part e of "−16" of the numerical data D41. The selection unit 104 selects the buffer region 1074 having the setting exponent of "−16" added by the buffer management unit 103 with reference to the buffer table 108 and outputs the selection result to the addition and subtraction calculation unit 105. Then, the addition and subtraction calculation unit 105 writes the significand part f (1.00000000000001) of the numerical data D41 in the buffer region 1074 selected by the selection unit 104.

Next, the input value acquisition unit 102 acquires, for example, the numerical data D42 (2.00000000000002E−32) as an input value. The buffer management unit 103 determines whether or not a buffer region that corresponds to the exponent part e of "−32" of the numerical data D42 is prepared with reference to the buffer table 108. When it is determined that the buffer region that corresponds to the exponent part e of "−32" is not prepared, the buffer management unit 103 adds a buffer region that corresponds to the exponent part e of "−32" of the numerical data D42. Thereby, the selection unit 104 selects, based on the exponent part e of "−32" of the numerical data D42, the buffer region 1075 having the setting exponent of "−32" with reference to the buffer table 108 and outputs the selection result to the addition and subtraction calculation unit 105. Then, the addition and subtraction calculation unit 105 writes the significand part f (2.00000000000002) of the numerical data D42 in the buffer region 1075 selected by the selection unit 104.

On the other hand, when a buffer region that corresponds to the exponent part e of the acquired input value is not added, an addition and subtraction calculation of an input value that does not match the buffer region is not performed. In the example of FIG. 14, the numerical data D42 of the exponent part e of "−32" may be all truncated. In this case, the result of performing addition or subtraction of the numerical data D41 to D43 becomes (0.000000000000000E+00).

As shown in Example 4, when a buffer region that corresponds to the exponent part e of the acquired input value is not prepared, the buffer management unit 103 is able to add a buffer region that corresponds to the exponent part e of the acquired input value. Therefore, the calculation part 100 is able to store in the buffer region, as a calculation result, even a small value that may be deleted as an error. Accordingly, it is possible to further enhance the accuracy of the calculation result.

Example 5

Figure 15:
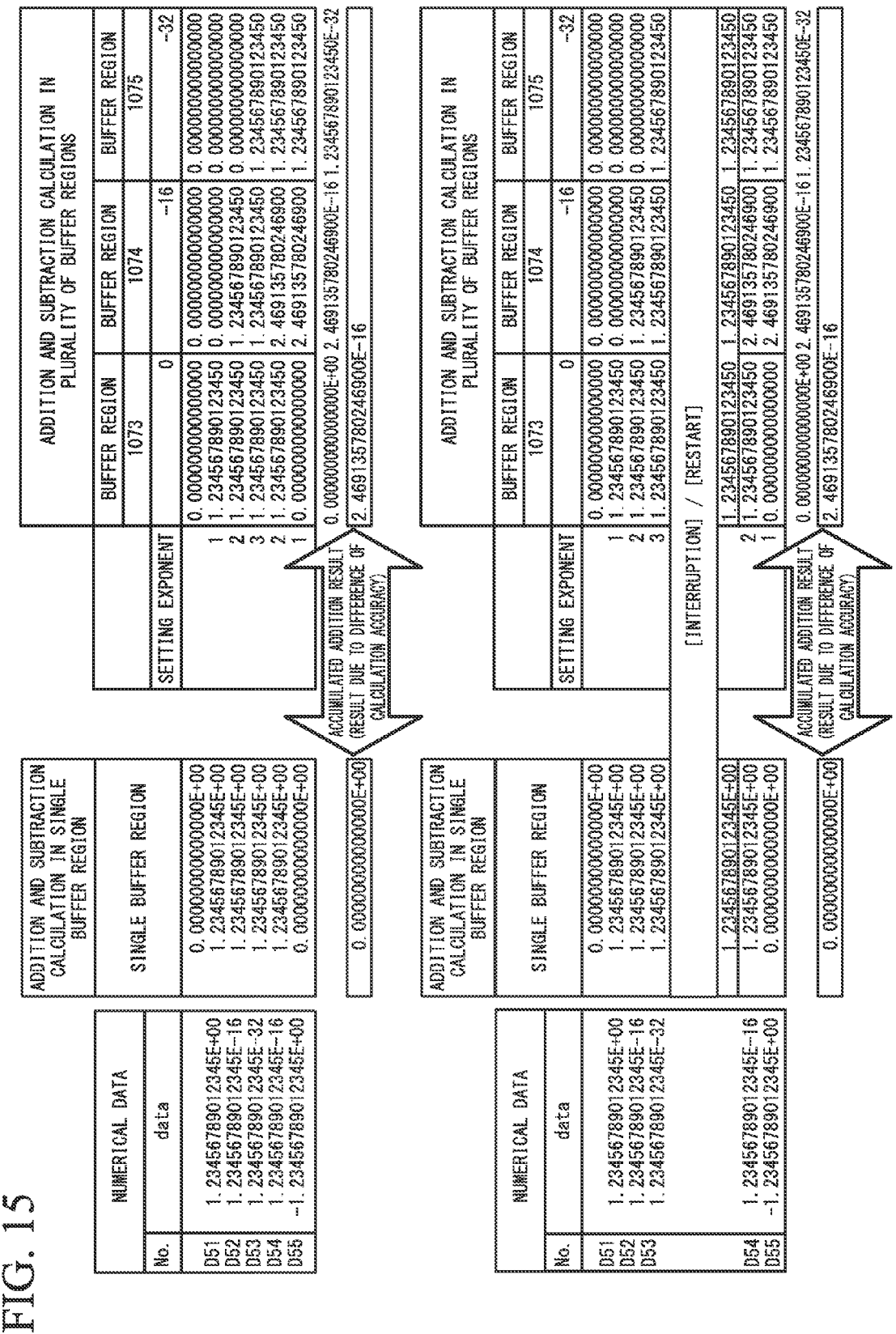
FIG. 15 is a reference diagram used to describe Example 5 by the calculation part.

Next, Example 5 by the calculation part 100 is described with reference to FIG. 15. FIG. 15 is a reference diagram used to describe Example 5 by the calculation part 100. Example 5 is described using an example in which numerical data D51 to D55 are acquired in this order by the input value acquisition unit 102 in a state where there has been no input value. The detail is the same as that of Example 1, and therefore the description of the detail is omitted.

As shown in FIG. 15, it is assumed that after performing the addition and subtraction calculation of the numerical data D51 to D53, the process of the calculation part 100 is interrupted and then is restarted. In this case, the calculation part 100 is able to use the information stored in the buffer regions 1073 to 1075 and perform the addition and subtraction calculation of the numerical data D54 to D55 to the calculation result of the numerical data D51 to D53. Accordingly, even when the calculation process is interrupted in the course of the calculation process and is restarted, it is possible to maintain the accuracy of the calculation result.

Note that, in the embodiment, an example in which the buffer size of the buffer regions 1071 to 1075 is fixed is described; however, the embodiment is not limited thereto. For example, the buffer management unit 103 may change the buffer size of the added buffer regions 1071 to 1075 depending on a memory residual quantity of the buffer unit. Thereby, when the memory residual quantity of the buffer unit 107 is small, the buffer management unit 103 is able to reduce the buffer size of each of the added buffer regions 1071 to 1075 and add a new buffer region that corresponds to the exponent part e of the input value.

Further, the embodiment is described using an example in which the addition and subtraction calculation unit 105 is a functional unit that performs both of the addition calculation and the subtraction calculation; however, the embodiment is not limited thereto. For example, the addition and subtraction calculation unit 105 may be a functional unit that performs only one of the addition and the subtraction.

Note that, part of the control unit 101 in the embodiment described above, for example, the input value acquisition unit 102, the buffer management unit 103, the selection unit 104, the addition and subtraction calculation unit 105, and the output determination unit 106 may be realized by a computer. In this case, a program for realizing control functions of the units may be recorded on a computer-readable recording medium. In this case, a computer system may read the program recorded on the recording medium and may execute the program, to thereby realize the control functions. Here, the "computer system" is a computer system built in the calculation part 100 and includes an OS and hardware such as a peripheral device. Further, examples of the "computer-readable recording medium" include portable media such as a flexible disk, a magneto-optical disc, a ROM, and a CD-ROM, and a storage device such as a hard disk built in a computer system. Further, examples of the "computer-readable recording medium" may include a recording medium that stores a program dynamically for a short period of time like a network such as the Internet, or a communication line when a program is transmitted through a communication line such as a telephone line, and may include a recording medium that stores a program for a predetermined period of time like a volatile memory in a computer system which serves as a server or a client in this case. Further, the above program may be a program for realizing some of the functions described above. Further, the above program may be a program capable of realizing the above functions by combination with a program already recorded in the computer system.

Further, the control unit 101 in the above-described embodiment may be realized in part or in whole as an integrated circuit such as an LSI (Large Scale Integration). The functional blocks of the control unit 101 may be individually realized as a processor or may be integrated in part or in whole to be realized as a processor. Further, the method of realizing an integrated circuit is not limited to an LSI, and the control unit 101 may be realized as a dedicated circuit or a universal processor. Further, when a technology of realizing an integrated circuit alternative to an LSI emerges thanks to the progress of a semiconductor technology, an integrated circuit according to the technology may be used.

While the embodiments of the present invention have been described above with reference to the accompanying drawings, it should be noted that the present invention is not limited to the embodiments, and various modifications and substitutions can be made without departing from the scope of the present invention.

What is claimed is:

1. A floating-point calculation apparatus comprising:
a selection part configured to select, based on an exponent part of an input value, a buffer that corresponds to the input value from a plurality of buffers, one of the buffers storing each of a plurality of values having a different exponent;
an addition and subtraction calculation part configured to write a result of performing an addition and subtraction calculation based on the input value and a value stored in the buffer selected by the selection part, on the buffer selected by the selection part;
an output determination part configured to determine, based on the value stored in the buffer, an output value of an addition and subtraction calculation based on a plurality of input values; and
a buffer management part configured to add a buffer that corresponds to the input value when it is determined, based on the exponent part of the input value, that a buffer used to store the input value is not prepared, wherein
when a number of significant digits of the result of performing the addition and subtraction calculation exceeds a number of significant digits of the buffer selected by the selection part, the addition and subtraction calculation part shifts right or shifts left part of the result of performing the addition and subtraction calculation and divides the result of performing the addition and subtraction calculation into values each being storable in one of a plurality of buffers.

2. The floating-point calculation apparatus according to claim 1, wherein
when a number of significant digits of the input value exceeds a number of significant digits of the buffer, the buffer management part divides the input value into values each being storable in one of a plurality of buffers.

3. The floating-point calculation apparatus according to claim 2, wherein
the buffer management part changes a buffer size of the added buffer depending on a memory residual quantity of the buffer.

4. The floating-point calculation apparatus according to claim 1, comprising:
a plurality of calculation parts each including the selection part, the addition and subtraction calculation part, and the output determination part, wherein
the floating-point calculation apparatus further comprises an entire process unit configured to obtain one calculation result based on output values from the plurality of calculation parts.

5. The floating-point calculation apparatus according to claim 4, wherein,
the entire process unit determines, based on an exponent of the buffer in each of the plurality of the calculation parts, an exponent of the output value acquired from the calculation part, and
the calculation part extracts an output value of an exponent determined by the entire process unit and outputs the extracted output value to the entire process unit.

6. The floating-point calculation apparatus according to claim 2, comprising:
a plurality of calculation parts each including the selection part, the addition and subtraction calculation part, and the output determination part, wherein
the floating-point calculation apparatus further comprises an entire process unit configured to obtain one calculation result based on output values from the plurality of calculation parts.

7. The floating-point calculation apparatus according to claim 3, comprising:
a plurality of calculation parts each including the selection part, the addition and subtraction calculation part, and the output determination part, wherein
the floating-point calculation apparatus further comprises an entire process unit configured to obtain one calculation result based on output values from the plurality of calculation parts.

8. A non-transitory computer-readable recording medium including a program for causing a computer to execute:
(a) selecting, based on an exponent part of an input value, a buffer that corresponds to the input value from a plurality of buffers, one of the buffers storing each of a plurality of values having a different exponent;
(b) writing a result of performing an addition and subtraction calculation based on the input value and a value stored in the buffer selected in (a), on the buffer selected in (a), and when a number of significant digits of the result of performing the addition and subtraction calculation exceeds a number of significant digits of the buffer selected in (a), shifting right or shifting left part of the result of performing the addition and subtraction calculation and dividing the result of performing the addition and subtraction calculation into values each being storable in one of a plurality of buffers;
(c) determining, based on the value stored in the buffer, an output value of an addition and subtraction calculation based on a plurality of input values; and
(d) determining whether or not a buffer used to store the input value is prepared based on the exponent part of the input value, and when it is determined that a buffer used to store the input value is not prepared, adding a buffer that corresponds to the input value.

9. A calculation apparatus comprising:
a parameter calculation part configured to calculate a parameter of a fluid that flows around an object per calculation unit;
an air resistance value calculation part configured to calculate an air resistance value that acts on the object based on the parameter of the fluid calculated by the parameter calculation part; and
a time direction addition and subtraction calculation part configured to perform an addition and subtraction calculation in a time direction of at least any one of a plurality of the parameters of the fluid calculated by the parameter calculation part and a plurality of the air resistance values calculated by the air resistance value calculation part, wherein
the time direction addition and subtraction calculation part comprises:
a selection part configured to input the parameter of the fluid or the air resistance value as an input value and select, based on an exponent part of the input value, a buffer that corresponds to the input value from a plurality of buffers, one of the buffers storing each of a plurality of values having a different exponent;
an addition and subtraction calculation part configured to write a result of performing an addition and subtraction calculation based on the input value and a value stored in the buffer selected by the selection part, on the buffer selected by the selection part;
an output determination part configured to determine, based on the value stored in the buffer, an output value of an addition and subtraction calculation based on a plurality of input values; and
a buffer management part configured to determine whether or not a buffer used to store the input value is prepared based on the exponent part of the input value, and when it is determined that a buffer used to store the input value is not prepared, add a buffer that corresponds to the input value, and wherein
when a number of significant digits of the result of performing the addition and subtraction calculation exceeds a number of significant digits of the buffer selected by the selection part, the addition and subtraction calculation part shifts right or shifts left part of the result of performing the addition and subtraction calculation and divides the result of performing the addition and subtraction calculation into values each being storable in one of a plurality of buffers.

10. The calculation apparatus according to claim 9, further comprising
a convergence determination part configured to determine whether or not a variation in the time direction of the air resistance value calculated by the air resistance value calculation part has converged, wherein
the time direction addition and subtraction calculation part performs an addition and subtraction calculation based on values obtained after the convergence determination part determines that the variation in the time direction of the air resistance value has converged.

* * * * *